US010169667B2

(12) United States Patent
Ogata et al.

(10) Patent No.: US 10,169,667 B2
(45) Date of Patent: Jan. 1, 2019

(54) EXTERNAL ENVIRONMENT RECOGNIZING DEVICE FOR VEHICLE AND VEHICLE BEHAVIOR CONTROL DEVICE

(71) Applicant: CLARION CO., LTD., Saitama (JP)

(72) Inventors: Takehito Ogata, Saitama (JP); Kenji Kato, Saitama (JP); Naoki Shimizu, Saitama (JP); Takafumi Hagi, Saitama (JP); Yoshitaka Uchida, Saitama (JP)

(73) Assignee: CLARION CO., LTD., Saitama (JP)

( * ) Notice: Subject to any disclaimer, the term of this patent is extended or adjusted under 35 U.S.C. 154(b) by 96 days.

(21) Appl. No.: 15/315,998

(22) PCT Filed: Oct. 28, 2015

(86) PCT No.: PCT/JP2015/080407
§ 371 (c)(1),
(2) Date: Dec. 2, 2016

(87) PCT Pub. No.: WO2016/117200
PCT Pub. Date: Jul. 28, 2016

(65) Prior Publication Data
US 2017/0140229 A1  May 18, 2017

(30) Foreign Application Priority Data
Jan. 20, 2015  (JP) .................. 2015-008258

(51) Int. Cl.
H04N 7/18  (2006.01)
G06K 9/62  (2006.01)
(Continued)

(52) U.S. Cl.
CPC ............ *G06K 9/00805* (2013.01); *B60R 1/00* (2013.01); *B60W 30/0956* (2013.01);
(Continued)

(58) Field of Classification Search
CPC .. G06K 9/00805; G06K 9/6202; G06T 7/248; B60R 1/00; B60R 2300/607;
(Continued)

(56) References Cited

U.S. PATENT DOCUMENTS

2010/0246901 A1* 9/2010 Yang ..................... B60R 1/00
382/107
2014/0272811 A1* 9/2014 Palan ..................... G07C 5/008
434/66
2014/0347485 A1* 11/2014 Zhang ................... B60R 11/04
348/148

FOREIGN PATENT DOCUMENTS

EP  3 002 708    4/2016
JP  2008-227646  9/2008
(Continued)

OTHER PUBLICATIONS

Arrospide et al., "Real-time vehicle detection and tracking based on perspective and non-perspective space cooperation," Real-Time Image and Video Processing, 2009, vol. 7244, International Society for Optics and Photonics, 2009.*
(Continued)

Primary Examiner — Thai Q Tran
Assistant Examiner — Christopher T Braniff
(74) Attorney, Agent, or Firm — Wenderoth, Lind & Ponack, L.L.P.

(57) ABSTRACT

A position of a moving object is reliably detected with high accuracy using only an image around a vehicle. A rear camera mounted on a vehicle obtains an original image around the vehicle, a movement region detector detects a moving object from the original image, and a difference calculator detects the moving object from a bird's-eye view image of the vehicle generated by a bird's-eye view image processor. A moving object position identifying part identifies a position of the moving object based on a distance from
(Continued)

the vehicle to the moving object detected by the movement region detector or the difference calculator, a lateral direction position of the moving object, and an actual width of the moving object detected by the movement region detector when a detected object determination part determines that the moving objects detected by the movement region detector and the difference calculator are the same moving object.

9 Claims, 31 Drawing Sheets

(51) Int. Cl.
    *G06K 9/00* (2006.01)
    *G08G 1/16* (2006.01)
    *G06T 7/246* (2017.01)
    *B60R 1/00* (2006.01)
    *B60W 30/095* (2012.01)

(52) U.S. Cl.
    CPC ....... *G06K 9/00362* (2013.01); *G06K 9/6202* (2013.01); *G06T 7/248* (2017.01); *G08G 1/166* (2013.01); *H04N 7/183* (2013.01); *B60R 2300/607* (2013.01); *B60R 2300/8033* (2013.01); *B60R 2300/8093* (2013.01); *B60W 2550/10* (2013.01); *B60W 2550/30* (2013.01); *B60W 2710/18* (2013.01); *B60W 2710/207* (2013.01); *B60W 2720/28* (2013.01)

(58) Field of Classification Search
    CPC ... B60R 2300/8033; B60R 2300/8093; B60W 30/0956; B60W 2550/10; B60W 2550/30; B60W 2710/18; B60W 2710/207; B60W 2720/28; G08G 1/166; H04N 7/183
    See application file for complete search history.

(56) References Cited

FOREIGN PATENT DOCUMENTS

| JP | 2011-48520 | 3/2011 |
|---|---|---|
| JP | 2011-87319 | 4/2011 |
| JP | 2014-154898 | 8/2014 |

OTHER PUBLICATIONS

International Search Report dated Dec. 22, 2015 in International (PCT) Application No. PCT/JP2015/080407.

Extended European Search Report dated Feb. 28, 2018 in European Patent Application No. 15878889.3.

Arrospide et al., "Real-time vehicle detection and tracking based on perspective and non-perspective space cooperation", Proceedings optical Diagnostics of Living Cells II, vol. 7244 pp. 72440H-1-72440H-12 (2009).

Laborda et al., "Vision-based vehicle detection and tracking with a mobile camera using a statistical framework", PhD Universidad Politecnica de Madrid, Retrieved from Internet: URL: http://oa.upm.es/11657/1/JON_ARROSPIDE_LABORDA.pdf, [retrieved Mar. 27, 2015] 204 pages (2012).

Song et al., "Vehicle detection by edge-based candidate generation and appearance-based classification", IEEE Intelligent Vehicles Symposium, pp. 428-433 (2008).

\* cited by examiner

I (x,y,t)

Ip (x,y,t)

Ic (x,y,t)

Ip (x,y,t−Δt)

Ip (x,y,t)

OPTICAL FLOW Op

| RECTANGULAR REGION Ri NUMBER | VERTEX COORDINATE OF RECTANGULAR REGION Ri | | | |
|---|---|---|---|---|
| | UPPER LEFT HORIZONTAL COORDINATE | UPPER LEFT VERTICAL COORDINATE | LOWER RIGHT HORIZONTAL COORDINATE | LOWER RIGHT VERTICAL COORDINATE |
| 1 | sx1 | sy1 | ex1 | ey1 |
| 2 | sx2 | sy2 | ex2 | ey2 |
| ⋮ | ⋮ | ⋮ | ⋮ | ⋮ |

| REGION Xj′ NUMBER | GRAVITY CENTER COORDINATE OF REGION Xj′ | |
| --- | --- | --- |
| | HORIZONTAL COORDINATE | VERTICAL COORDINATE |
| 1 | gx1 | gy1 |
| 2 | gx2 | gy2 |
| ⋮ | ⋮ | ⋮ |

FIG.29A

| MOVING OBJECT DETECTION BASED ON DIFFERENCE BETWEEN BIRD'S-EYE VIEW IMAGES | MOVING OBJECT DETECTION BASED ON OPTICAL FLOW | PEDESTRIAN PATTERN DETECTION | PROCESS OF CALCULATING DISTANCE Di | PROCESS OF CALCULATING LATERAL DIRECTION POSITION FXi | PROCESS OF CALCULATING WIDTH Wi OF MOVING OBJECT |
|---|---|---|---|---|---|
| DETECTION | NO DETECTION | DETECTION | CALCULATION BASED ON (HXi, HYi) OBTAINED BY DIFFERENCE BETWEEN BIRD'S-EYE VIEW IMAGES | CALCULATION BASED ON (FXp, FYp) OBTAINED AS PEDESTRIAN PATTERN AND Di | CALCULATION BASED ON Di AND WIDTH wp OF PEDESTRIAN PATTERN |
| DETECTION | DETECTION | DETECTION | CALCULATION BASED ON (HXi, HYi) OBTAINED BY DIFFERENCE BETWEEN BIRD'S-EYE VIEW IMAGES | CALCULATION BASED ON (FXi, FYi) OBTAINED AS OPTICAL FLOW AND (FXp, FYp) OBTAINED AS PEDESTRIAN PATTERN AND Di | CALCULATION BASED ON Di AND WIDTH wi OF PEDESTRIAN PATTERN |

FIG.29B

| MOVING OBJECT DETECTION BASED ON DIFFERENCE BETWEEN BIRD'S-EYE VIEW IMAGES | MOVING OBJECT DETECTION BASED ON OPTICAL FLOW | VEHICLE PATTERN DETECTION | PROCESS OF CALCULATING DISTANCE Di | PROCESS OF CALCULATING LATERAL DIRECTION POSITION FXi | PROCESS OF CALCULATING WIDTH Wi OF MOVING OBJECT |
|---|---|---|---|---|---|
| DETECTION | NO DETECTION | DETECTION | CALCULATION BASED ON (HXi, HYi) OBTAINED AS VEHICLE PATTERN | CALCULATION BASED ON (FXv, FYv) OBTAINED AS VEHICLE PATTERN AND Di | CALCULATION BASED ON Di AND WIDTH wi OF VEHICLE PATTERN |
| DETECTION | DETECTION | DETECTION | CALCULATION BASED ON (HXi, HYi) OBTAINED AS VEHICLE PATTERN | CALCULATION BASED ON (FXi, FYi) OBTAINED BY OPTICAL FLOW AND (FXv, FYv) OBTAINED AS VEHICLE PATTERN AND Di | CALCULATION BASED ON Di AND WIDTH wi OF VEHICLE PATTERN |

EXTERNAL ENVIRONMENT RECOGNIZING DEVICE FOR VEHICLE AND VEHICLE BEHAVIOR CONTROL DEVICE

CROSS-REFERENCE TO RELATED APPLICATION

The present application is based on and claims priority from Japanese Patent Application No. 2015-008258, filed on Jan. 20, 2015, the disclosure of which is hereby incorporated by reference in its entirety.

TECHNICAL FIELD

The present invention relates to an external environment recognizing device for a vehicle that detects a position of a moving object around a vehicle, and a vehicle behavior control device using the same.

BACKGROUND ART

A technique relating to an external environment recognizing device for a vehicle has been developed in recent years. Such a device is configured to detect a moving object (obstacle) around a vehicle with a camera mounted on a vehicle, inform a driver of a risk of a collision between a vehicle and a moving object, and automatically stop the vehicle to avoid the collision between the vehicle and the moving object.

For example, an object detection device taught by Patent Literature 1 is configured to detect a moving object around a vehicle by processing an image captured by a camera having a fisheye lens.

A vehicle circumference monitoring device taught by Patent Literature 2 is configured to detect a moving object and a stationary object with optical flow detected from two original images captured at different times and a result of difference calculation between bird's-eye view images obtained through coordinate transformation of the two original images.

CITATION LIST

Patent Literature

Patent Literature 1: JP2014-154898A
Patent Literature 2: JP2011-48520A

Technical Problem

However, the object detection device taught by Patent Literature 1 is configured to process the image captured by the camera having the fisheye lens. For this reason, the edge portion of the image has large distortion, and a subject is imaged at a tilt. It is therefore difficult to accurately identify the position of the moving object (for example, foot of pedestrian). When the position of the moving object (for example, position of foot of pedestrian) is inaccurately identified, an inaccurate positional relationship between the vehicle and the moving object may be obtained. Patent Literature 1 is silent about means for improving detection accuracy by accurately identifying the position of the detected moving object.

The vehicle circumference monitoring device taught by Patent Literature 2 has no means for measuring a distance to the detected object. It is possible to use such a device for warning by simply detecting the presence or absence of the moving object. However, it is difficult to use such a device for controlling the vehicle by accurately obtaining its position. The distance to the detected object may be measured by adding a measurement sensor such as a known sensor to the configuration described in Patent Literature 2. However, if the measurement sensor is added to the configuration described in Patent Literature 2, the number of sensors to be mounted on the vehicle is increased, resulting in a complex system structure and an increase in the costs.

The present invention has been made in view of the above problems, and an object of the present invention is to provide an external environment recognizing device for a vehicle that accurately detects a position of a moving object with high accuracy only with an image captured by a camera without adding a measurement sensor, and a vehicle behavior control device using such an external environment recognizing device for a vehicle.

Solution to Problem

To solve the above problems, an external environment recognizing device for a vehicle according to the present invention includes an image processor that is installed in the vehicle and obtains an image around the vehicle, a first object detector that detects a moving object from the image, a bird's-eye view image processor that generates a bird's-eye view image of the vehicle from the image, a second object detector that detects the moving object from the bird's-eye view image, a detected object determination part that determines the moving object detected by the first object detector and the moving object detected by the second object detector are a same moving object when a distance between the moving object detected by the first object detector and the moving object detected by the second object detector is within a predetermined distance, and a moving object position identifying part that identifies a position of the moving object based on a distance from the vehicle to the moving object detected by the first object detector or the second object detector, a lateral direction position of the moving object, and a width of the moving object detected by the first object detector when the detected object determination part determines that the moving object detected by the first object detector and the moving object detected by the second object detector are the same moving object.

Advantageous Effects

According to the external environment recognizing device for a vehicle of the present invention, after the detected object determination part determines that the moving objects in which the distance between the moving objects is within a predetermined distance are the same moving object based on the detection results of the first object detector and the second object detector, the moving object position identifying part calculates the distance to the detected moving object and the lateral direction position based on the detection result of the first object detector or the second object detector, and calculates the width of the detected moving object based on the detection result of the first object detector. With this configuration, the position of the moving object and the distance from the vehicle to the moving object are reliably detected with high accuracy.

BRIEF DESCRIPTION OF DRAWINGS

FIG. 11 is a table describing a memory type of information on a position of the moving object detected by the difference between the bird's-eye view images.

FIG. 29A is a table showing a process of identifying the position of the pedestrian when the pedestrian is detected as the moving object.

FIG. 29B is a table showing a process of identifying the position of the vehicle when the vehicle is detected as the moving object.

DESCRIPTION OF EMBODIMENTS

Embodiments of a vehicle behavior control device using an external environment recognizing device for a vehicle according to the present invention will be hereinafter described with reference to the drawings.

Embodiment 1

Embodiment 1 relates to a vehicle behavior control device that detects a moving object behind a vehicle, and stops the vehicle with braking force when the vehicle is at a risk of a collision with the moving object in reverse parking.

Figure 1:
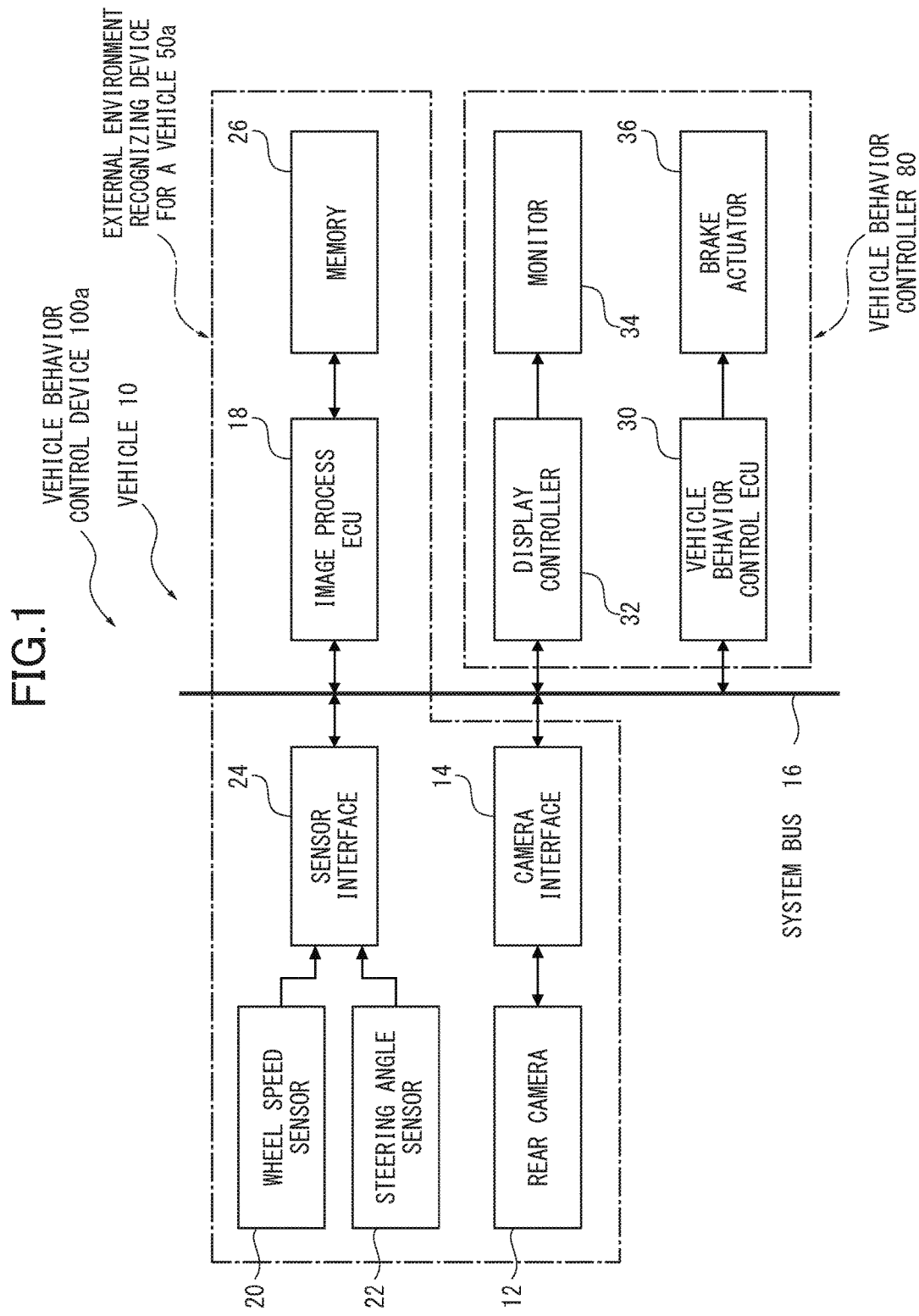
FIG. 1 is a block diagram showing hardware of a vehicle behavior control device using an external environment recognizing device for a vehicle according to Embodiment 1 of the present invention.

A configuration of hardware of the vehicle behavior control device of this embodiment will be described with reference to FIG. 1. The vehicle behavior control device 100a according to Embodiment 1 includes an external environment recognizing device for a vehicle 50a that recognizes the moving object such as a pedestrian or another vehicle behind the vehicle 10 and a vehicle behavior controller 80 that controls the behavior of the vehicle 10 based on the position of the recognized moving object.

The external environment recognizing device for a vehicle 50a includes a rear camera 12, a camera interface 14, a wheel speed sensor 20, a steering angle sensor 22, a sensor interface 24, an image process ECU 18, and a memory 26.

The vehicle behavior controller 80 includes a vehicle behavior control ECU 30, a brake actuator 36, a display controller 32, and a monitor 34.

The vehicle behavior control device 100a includes a system bus 16 such as a CAN bass for required information passing.

The rear camera 12 captures an image including a road surface behind the vehicle 10. The image captured by the rear camera 12 is sent to the image process ECU 18 that executes an image recognizing process via the camera interface 14 and the system bus 16 such as a CAN bus. The vehicle 10 includes the wheel speed sensor 20 that detects a wheel speed and the steering angle sensor 22 that detects a steering angle. The output of these sensors is sent to the image process ECU 18 via the sensor interface 24 and the system bus 16.

The image process ECU 18 executes the image process described later to detect the moving object such as a pedestrian or another vehicle, and to identify the position of the detected moving object. In this case, the result and the on-going status of the image process are temporarily stored in the memory 26.

The positional information of the moving object identified by the image process is sent to the vehicle behavior controller 80. The vehicle behavior control ECU 30 that controls the behavior of the vehicle 10 determines the presence or absence of the risk of the collision between the vehicle 10 and the moving object. When the vehicle behavior control ECU 30 determines the presence of the risk of the collision, the vehicle behavior control ECU 30 outputs necessary alert or warning to the monitor 34 installed in the vehicle 10 through the display controller 32, so as to draw attention of a driver of the vehicle 10. When the vehicle behavior control ECU 30 determines an unavoidable collision, the vehicle behavior control ECU 30 drives the brake actuator 36 that generates a braking force of the vehicle 10 to stop the vehicle 10.

Figure 2:
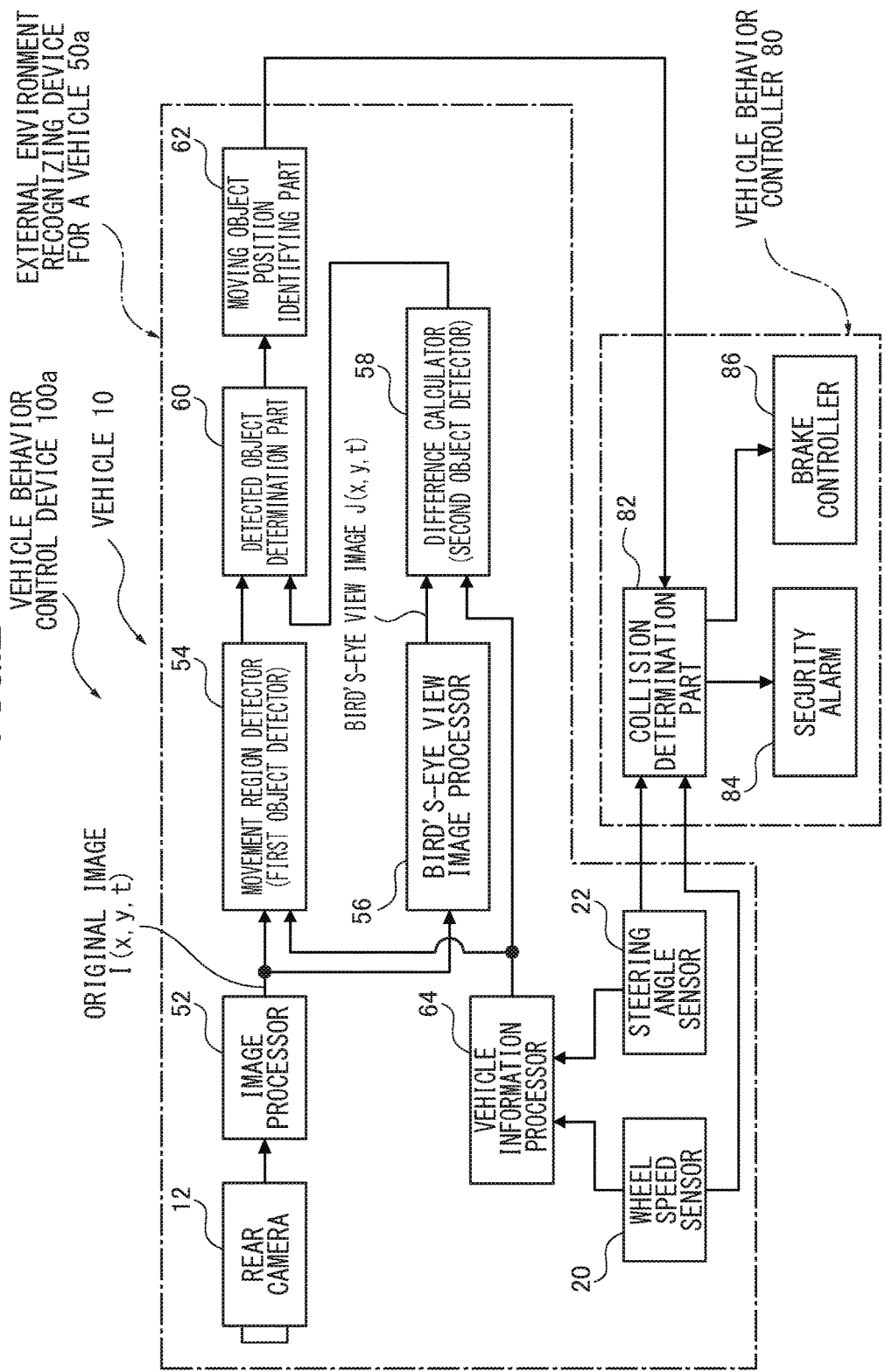
FIG. 2 is a functional block diagram showing a configuration of the vehicle behavior control device using the external environment recognizing device for a vehicle according to Embodiment 1 of the present invention.
Figure 3:
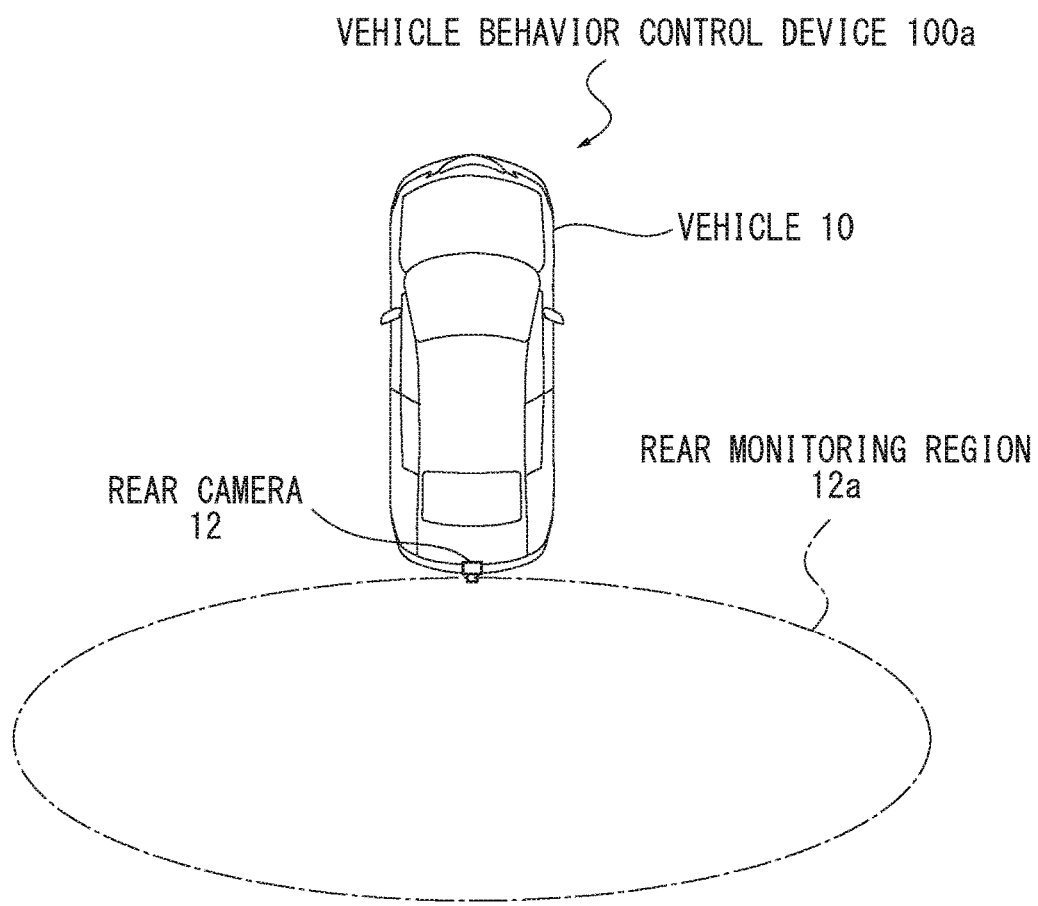
FIG. 3 is a view describing a rear camera mounted on a vehicle in Embodiment 1.

The functional configuration of the vehicle behavior control device 100a of the present embodiment will be described with reference to FIGS. 2 and 3. FIG. 2 is a functional block diagram showing a functional configuration of the vehicle behavior control device 100a. FIG. 3 is a view showing the vehicle behavior control device 100a installed in the vehicle.

As shown in FIG. 2, the external environment recognizing device for a vehicle 50a includes the rear camera 12, an image processor 52 that converts the image captured by the rear camera 12 into digital information as an original image I (x, y, t), a movement region detector 54 (first object detector) that detects the moving object from the two original images obtained at different times, a bird's-eye view image processor 56 that converts the original image I (x, y, t) into a bird's-eye view image J (x, y, t), a difference calculator 58 (second object detector) that detects the moving object through calculation of a difference between the two bird's-eye view images generated from the two original images obtained at different times, a detected object determination part 60 that determines whether or not the moving object detected by the movement region detector 54 is the same as the moving object detected by the difference calculator 58, a moving object position identifying part 62 that identifies the position of the moving object when the detected object determination part 60 determines that the moving objects are the same moving object, and a vehicle information processor 64 that obtains the steering angle of the vehicle 10 detected by the steering angle sensor 22 and the wheel speed of the vehicle 10 detected by the wheel speed sensor 20.

As illustrated in FIG. 2, the vehicle behavior controller 80 includes a collision determination part 82 that determines the presence or absence of the risk of a collision between the vehicle 10 and the moving object, a security alarm 84 that outputs alarm when the collision determination part 82 determines the presence of the risk of the collision between the vehicle 10 and the moving object, and a brake controller 86 that stops the vehicle 10 with a braking force when the collision determination part 82 determines an unavoidable collision between the vehicle 10 and the moving object.

As illustrated in FIG. 3, the rear camera 12 is mounted near-horizontally near a rear license plate of the vehicle 10, and captures the image of a rear monitoring region 12a including the road surface. The rear camera 12 includes a wide-angle lens such as a fisheye lens so as to capture a right and left wide region from a position close to the vehicle 10 to a position away from the vehicle 10.

A process of detecting the moving object from the original image by the movement region detector 54 (first object detector) will be described with reference to FIGS. 4, 5A, and 5B.

Figure 4:
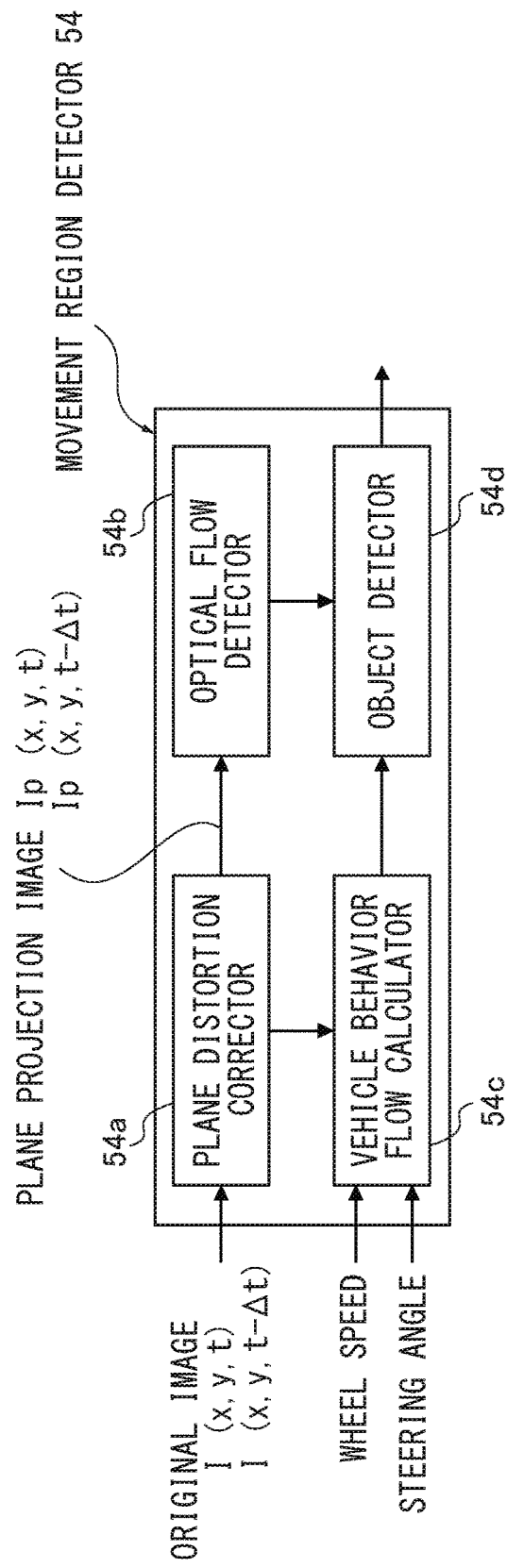
FIG. 4 is a functional block diagram showing a detailed configuration of a movement region detector (first object detector) in Embodiment 1.

FIG. 4 is a functional block diagram showing the detailed internal configuration of the movement region detector 54. The movement region detector 54 includes a plane distortion corrector 54a that converts the original image I (x, y, t) into a plane projection image Ip (x, y, t) in which the original image is projected on a virtual plane vertical to the road surface and extending in the direction parallel to right and left direction of the vehicle 10 (direction parallel to light receiving surface of rear camera 12). The movement region detector 54 also includes an optical flow detector 54b that detects optical flow based on the plane projection image Ip (x, y, t) generated from the original image I (x, y, t) captured at a time t and the plane projection image Ip (x, y, t−Δt) generated from the original image I (x, y, t−Δt) captured at a time t−Δt. The movement region detector 54 also includes a vehicle behavior flow calculator 54c that calculates the optical flow, which is assumed to generate along the movement of the vehicle 10 during the time Δt, based on change in the wheel speed and the steering angle of the vehicle from the time t−Δt to the time t. The movement region detector 54 also includes an object detector 54d that detects the moving object based on the optical flow detected by the optical flow detector 54b and the optical flow calculated by the vehicle behavior flow calculator 54c. In addition, the time Δt is set to a value according to the performance of the hardware to be used, for example, a value of several tens of seconds.

Figure 5A:
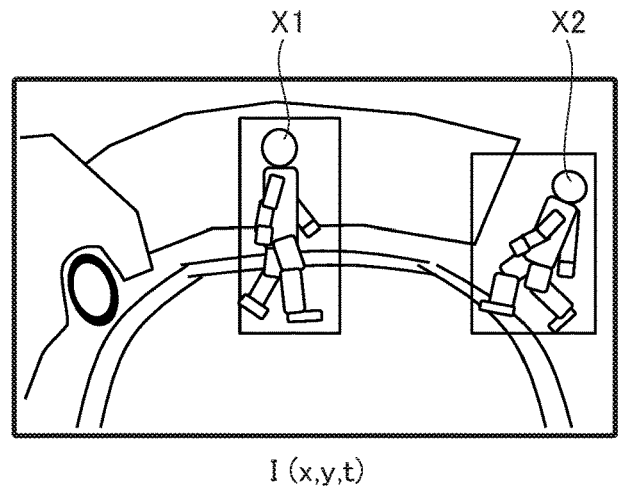
FIG. 5A is a view showing an example of an original image captured by the rear camera.

Due to a wide-angle lens arranged in the rear camera 12, the captured original image I (x, y, t) has in the edge portion thereof large distortion, as illustrated in FIG. 5A. When the original image I (x, y, t) includes a pedestrian X1 and a pedestrian X2, the pedestrian X2 captured in the edge portion of the image tilts as shown in FIG. 5A. As the pedestrian is detected as a rectangular region as described later, the position and the width of the pedestrian X2 to be detected are shifted if the original image I (x, y, t) having the tilted pedestrian X2 is directly processed. For this reason, the plane distortion corrector 54a executes a process of eliminating such distortion.

Figure 5B:
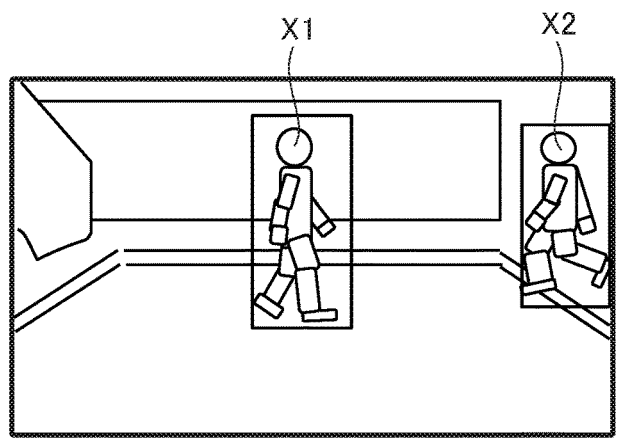
FIG. 5B is a view showing an example of a plane projection image into which the original image shown in FIG. 5A is converted.

More specifically, the original image I (x, y, t) is projected onto a virtual plane vertical to the road surface and extending in the direction parallel to the right and left direction of the vehicle 10 to generate the plane projection image Ip (x, y, t) (projection image) as shown in FIG. 5B. The distortion of the original image I (x, y, t) is eliminated by the projection process onto the virtual plane, and the pedestrian X2 is converted into an upright posture image as illustrated in FIG. 5B. The position and the width of the pedestrian are accurately identified by detecting the pedestrians X1 and X2 from the plane projection image Ip (x, y, t).

The plane projection image Ip (x, y, t) is generated with a prepared distortion correction table. The distortion correction table shows the correspondence relationship between the coordinate of the distortion-uncorrected image and the coordinate of the distortion-corrected image. In addition, the distortion correction table is previously prepared by so-called calibration, and stored in the plane distortion corrector 54a.

Figure 6A:
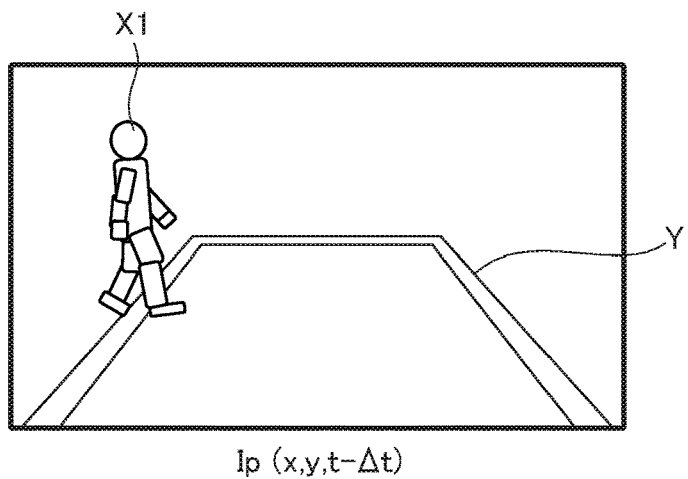
FIG. 6A is a first view describing a process of detecting a moving object based on optical flow by the movement region detector, and also a view showing an example of a plane projection image obtained from an original image captured at a time t−Δt.
Figure 6B:
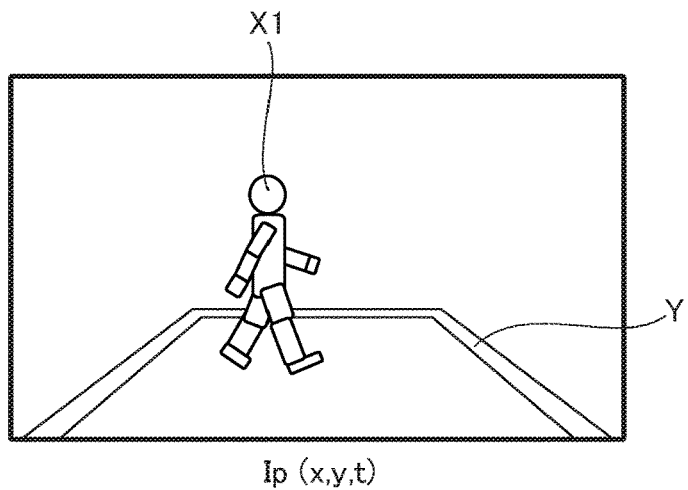
FIG. 6B is a second view describing the process of detecting a moving object based on the optical flow by the movement region detector, and also a view showing an example of a plane projection image obtained from an original image captured at time t.
Figure 6C:
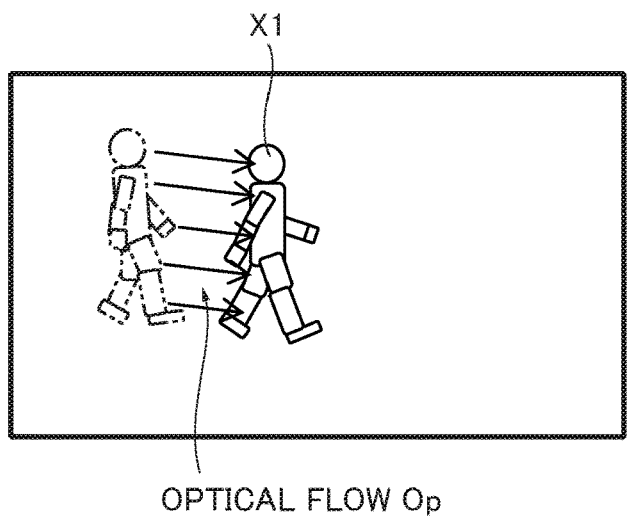
FIG. 6C is a third view describing the method of detecting a moving object based on the optical flow by the movement region detector, and also a view showing an example of the detected optical flow.

FIGS. 6A to 6C are views describing the function of the movement region detector 54. FIG. 6A shows one example of the plane projection image Ip (x, y, t−Δt) obtained from the original image I (x, y, t−Δt) captured by the rear camera 12 (FIG. 2) at the time t−Δt. As shown in FIG. 6A, the plane projection image Ip (x, y, t−Δt) includes the pedestrian X1 and a parking frame line Y.

FIG. 6B shows one example of the plane projection image Ip (x, y, t) obtained from the original image I (x, y, t) captured by the rear camera 12 (FIG. 2) at the time t. FIG. 6B shows that the pedestrian X1 is moved forward (rightward on image) during the time Δt, and the parking frame line Y is also displaced, which shows that the vehicle 10 moves backward during the time Δt.

FIG. 6C is a view showing only optical flow generated along the movement of the pedestrian, the optical flow being detected through the comparison between the plane projection image Ip (x, y, t−Δt) and the plane projection image Ip (x, y, t).

When the plane projection image Ip (x, y, t−Δt) is compared with the plane projection image Ip (x, y, t), the optical flow generated along the movement of the vehicle 10 is detected. The optical flow generated along the movement of the vehicle 10 is estimated by integrating the behavior (wheel speed and steering angle) of the vehicle during the time Δt. The optical flow Op shown in FIG. 6C has a direction different from that of the estimated optical flow generated along the movement of the vehicle 10. Namely, FIG. 6C shows the image in which the optical flow (optical flow showing movement of parking frame line Y) generated along the movement of the vehicle 10 is concealed and only the optical flow Op showing the movement of the pedestrian is detected.

The optical flow Op detected as described above is analyzed, and the regions moved in the same direction at the same amount are integrated, so as to recognize one moving object. As a method of detecting the optical flow Op from two images captured at different times is widely used, the description of the detailed method thereof is omitted. In short, one image is divided into a plurality of small regions (one small regions), small regions (the other small regions) having gray value distribution similar to respective small regions are searched from the other image, and the corresponded one small region is set as the starting point of the optical flow and the other small region is set as the end point of the optical flow.

When the optical flow of the small regions is close to each other and has the same length and direction, which are set as the end point of the optical flow detected as described above, these small regions are combined, and are detected as the regions showing one moving object.

Figures 7, 8:
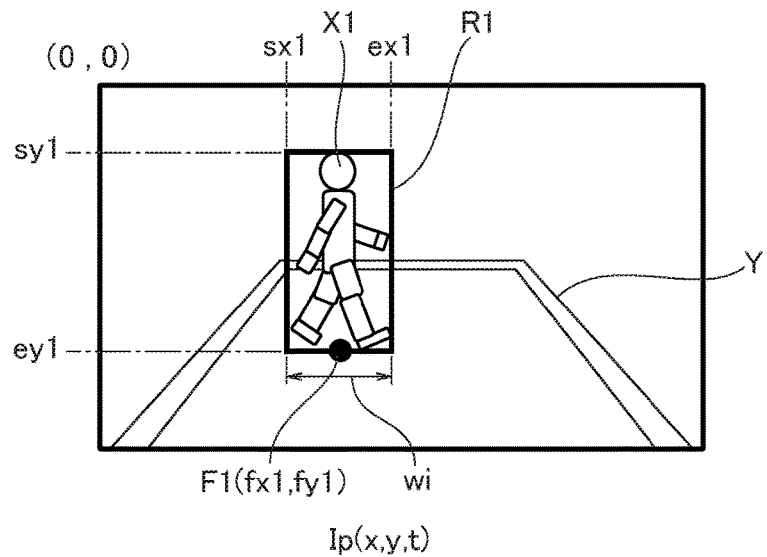
FIG. 7 is a view describing a detection result of the moving object detected based on the optical flow.
FIG. 8 is a table describing a memory type of information on a size and a position of the moving object detected based on the optical flow.

FIG. 7 shows one example of the region showing the moving object detected as described above. As illustrated in FIG. 7, the pedestrian X1 is detected as the moving object, the position of a rectangular region R1 which has contact with the outside of the pedestrian X1 is stored in the movement region detector 54. In addition, when a plurality of moving objects is detected, a plurality of rectangular regions Ri (i=1, 2, . . . ) which has contact with the outside of each moving object is defined, and the position of each rectangular region Ri is stored in the movement region detector 54.

FIG. 8 is a table showing the memory format of the positions and the sizes of the moving objects stored in the movement region detector 54 (object detector 54d (FIG. 4)). As shown in FIG. 8, the vertex coordinate (sxi, syi) of the upper left and the vertex coordinate (exi, eyi) of the lower right in each rectangular region are stored together with the number of the rectangular region Ri (i=1, 2, . . . ).

A process of detecting a moving object from a bird's-eye view image will be described with reference to FIGS. 9, 10A to 10C. The difference calculator 58 (second object detector) executes the process.

Figure 9:
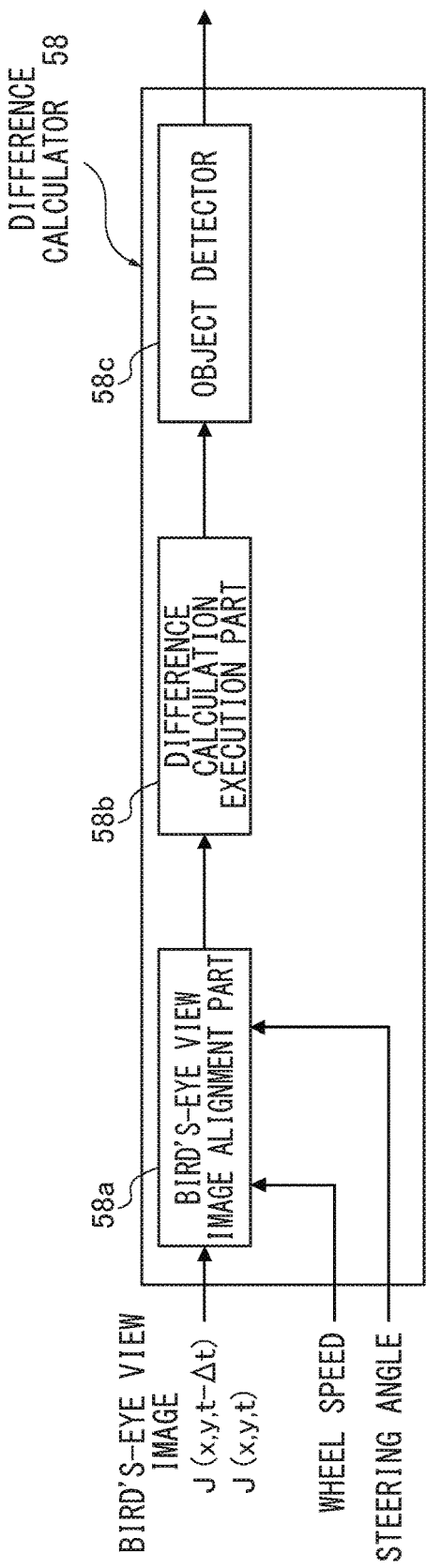
FIG. 9 is a functional block diagram showing a detailed configuration of a difference calculator (second object detector) in Embodiment 1.

FIG. 9 is a functional block diagram showing the detailed configuration of the difference calculator 58. As shown in FIG. 9, the difference calculator 58 includes a bird's-eye view image alignment part 58a, a difference calculation execution part 58b, and an object detector 58c.

Figure 10A:
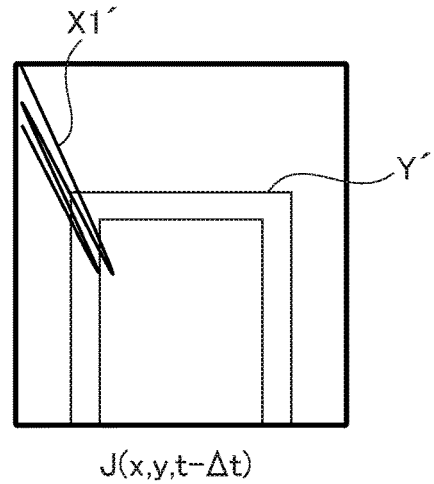
FIG. 10A is a first view describing a process of detecting a moving object through difference calculation of a bird's-eye view image by the difference calculator, and also a view showing an example of the bird's-eye view image into which the original image captured at the time t−Δt is converted.
Figure 10B:
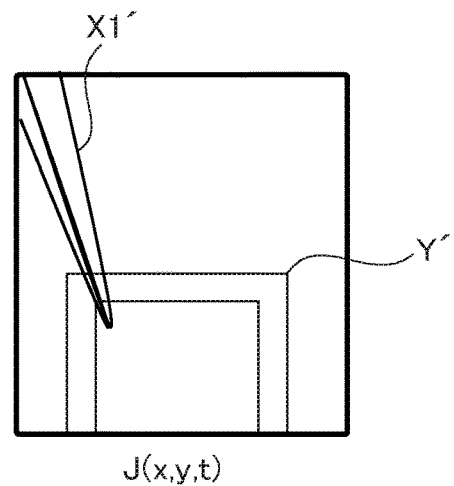
FIG. 10B is a second view describing the process of detecting a moving object through the difference calculation of the bird's-eye view image by the difference calculator, and also a view showing an example of the bird's-eye view image into which the original image imaged at the time t is converted.
Figure 10C:
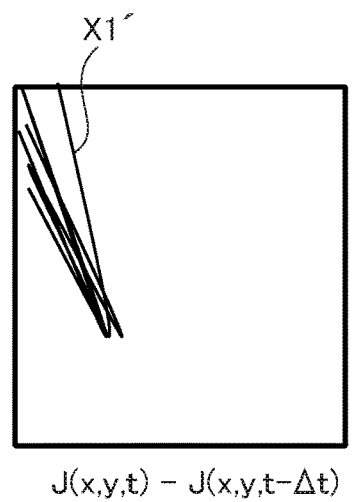
FIG. 10C is a third view describing the process of detecting a moving object through the difference calculation of the bird's-eye view image by the difference calculator, and also a view showing a result in which the bird's-eye view image in FIG. 10A is removed from the bird's-eye view image in FIG. 10B after the image in FIG. 10A is aligned with the image in FIG. 10B.

FIGS. 10A to 10C are views describing the functions of the difference calculator 58. FIG. 10A shows one example in which the original image I (x, y, t−Δt) captured by the rear camera 12 (FIG. 2) at the time t−Δt is converted into the bird's-eye view image J (x, y, t−Δt) by the bird's-eye view image processor 56 (FIG. 2). As illustrated in FIG. 10A, the pedestrian X1 is converted into a region X1' in the bird's-eye view image J (x, y, t−Δt), and the parking frame line Y is converted into a region Y' in the bird's-eye view image J (x, y, t−Δt). The original image is converted into the bird's-eye view image J (x, y, t−Δt) with a coordinate conversion table (not shown) previously stored in the bird's-eye view image processor 56. The coordinate conversion table includes the correspondence relationship between the coordinate of the original image and the coordinate of the bird's-eye view image. In addition, this coordinate conversion table may include the function of a distortion correction table that corrects the above distortion to correct the distortion along with the conversion of the original image into the bird's-eye view image.

FIG. 10B shows one example in which the original image I (x, y, t) captured by the rear camera 12 (FIG. 2) at the time t is converted into the bird's-eye view image J (x, y, t). As shown in FIG. 10B, the region X1' is displaced along the movement of the pedestrian X1. The region Y' corresponding to the parking frame line Y is also displaced along the movement of the vehicle 10, as shown in FIG. 10B.

FIG. 10C shows an image obtained by the difference calculation (frame difference) that takes the bird's-eye view image J (x, y, t−Δt) out of the bird's-eye view image J (x, y, t). Before the difference calculation, the bird's-eye view image J (x, y, t−Δt) is aligned with the bird's-eye view image J (x, y, t) by the bird's-eye view image alignment part 58a by previously converting the coordinate of the bird's-eye view image J (x, y, t−Δt) based on the movement direction and the displacement of the road surface region of the bird's-eye view image, which are estimated from the behavior of the vehicle (change in wheel speed and steering angle), such that the movement of the road surface along with the behavior of the vehicle during the time Δt is controlled.

More specifically, the position of the region Y' corresponding to the parking frame line Y in the bird's-eye view image J (x, y, t) is aligned with the position of the region Y' corresponding to the parking frame line Y in the bird's-eye view image J (x, y, t−Δt). In the image obtained by the difference calculation as shown in FIG. 10C, the information of the region Y' is thereby concealed, and the region corresponding to the movement of the region X' as the pedestrian is only detected.

Next, the object detector 58c detects the moving object from the image (FIG. 10C) by the difference calculation.

More specifically, the image obtained by the difference calculation between the bird's-eye view images is digitized by a predetermined threshold, and the extracted region is detected as the region showing the moving object. In addition, the detected region is labeled, and the gravity center of each region Xj' (j=1, 2, . . . ) is calculated, so as to distinguish each region.

FIG. 11 is a table describing the memory format of the positions of the moving objects stored in the object detector 58c. As shown in FIG. 11, the horizontal coordinate gxj (j=1, 2, . . . ) and the vertical coordinate gyj (j=1, 2, . . . ) of the gravity center of each region Xj' (j=1, 2, . . . ) detected as the moving object are stored together with the number of the detected region.

A process of determining whether or not the moving object detected by the movement region detector 54 (first object detector) and the moving object detected by the difference calculator 58 (second object detector) are the same will be described with reference to FIGS. 7, 12A to 12C. The detected object determination part 60 (FIG. 2) executes this process.

The coordinate value representing each of the detected moving objects is firstly calculated to determine whether or not the moving object detected by the movement region detector 54 (first object detector) and the moving object detected by the difference calculator 58 (second object detector) are the same.

To be specific, the coordinate value of a point F1 (fx1, fy1) shown in FIG. 7 is calculated as the object position coordinate in the moving object detected by the movement region detector 54 (first object detector). The point F1 corresponds to the center of the lower side of the rectangular region R1 that has contact with the outside of the moving object. The horizontal coordinate is therefore calculated by fx1=(sx1+ex1)/2. The vertical coordinate is also calculated by fy1=ey1. When a plurality of moving objects is detected, each coordinate value of a plurality of points Fi (fxi, fyi) (i=1, 2, . . . ) is calculated with reference to the stored information shown in FIG. 8. Note that the coordinate value of the point Fi (fxi, fyi) (i=1, 2, . . . ) may be calculated along with the moving object detection process by the movement region detector 54, and be stored together with the information shown in FIG. 8.

Figure 12A:
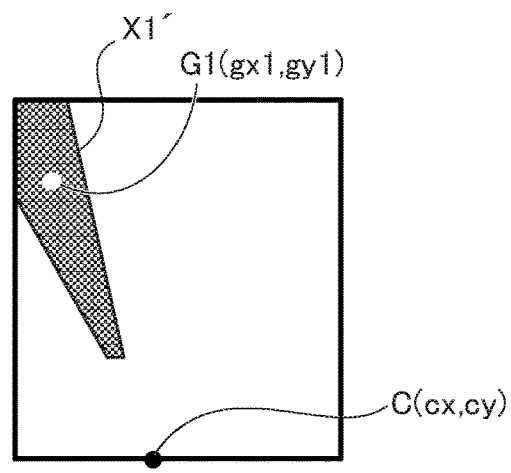
FIG. 12A is a first view describing a moving object detected from the bird's-eye view image.
Figure 12B:
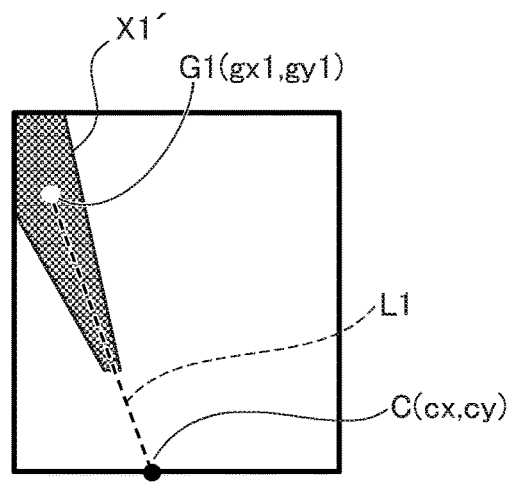
FIG. 12B is a second view describing the moving object detected from the bird's-eye view image.
Figure 12C:
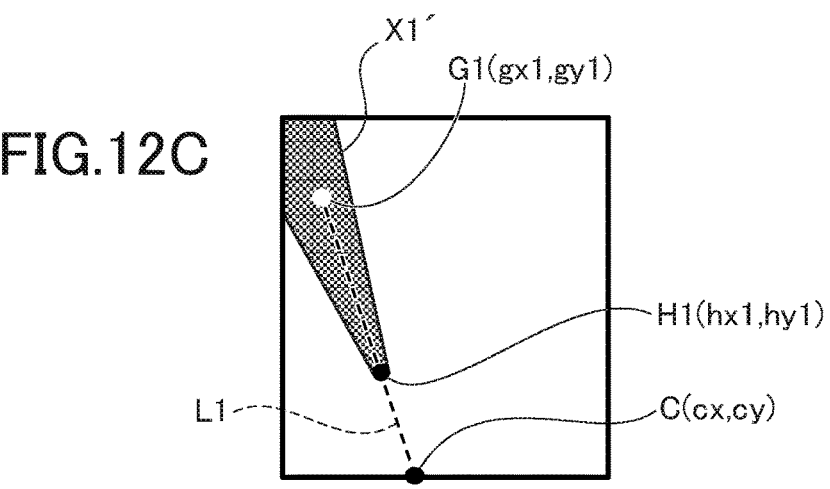
FIG. 12C is a third view describing the moving object detected from the bird's-eye view image.

Next, the coordinate value representing the moving object is calculated with the procedure described by FIGS. 12A to 12C based on the gravity center coordinate (FIG. 11) of the region detected from the moving object detected by the difference calculator 58 (second object detector).

At first, as shown in FIG. 12A, a rear camera position C (cx, cy) showing the position of the rear camera 12 (FIG. 2) is set in the image showing the difference result between the bird's-eye view images. The rear camera position C is set according to the display region of the bird's-eye view image. In the example illustrated in FIG. 12A, the rear camera position C is set on the lower side of the bird's-eye view image. The coordinate of a gravity center point G1 of the region X1' showing the moving object is set as G1 (gx1, gy1).

Next, as shown in FIG. 12B, a line L1 connecting the gravity center point G1 (gx1, gy1) and the rear camera position C (cx, cy) is set.

As shown in FIG. 12C, a grounding point H1 (hx1, hy1) close to the rear camera position C (cx, cy) is obtained from the points in the region X1'. More specifically, the position of the point farthest from the gravity center point G1, which has the same label value as the region X1', is obtained by searching on the line L1 from the gravity center point G1 (gx1, gy1) to the rear camera position C (cx, cy). The grounding point H1 (hx1, hy1) searched as described above shows the position of the grounding point at which the region X1' grounds the road surface. When a plurality of moving objects is detected by the difference calculation of the bird's-eye view images, each coordinate value (hxj, hyj) (j=1, 2, . . . ) of a plurality of grounding points Hj on the image is calculated with reference to the positional information of the moving object shown in FIG. 11. Note that the coordinate value (hxj, hyj) (j=1, 2, . . . ) of the grounding point Hj on the image may be calculated at the same time as the detection of the moving object from the bird's-eye view image, and be stored together with the information in FIG. 11.

Next, the coordinate of the point Fi (i=1, 2, . . . ) (FIG. 7), which represents the object position coordinate in each region, on the image is compared with the coordinate of the grounding point Hj (j=1, 2, . . . ), which represents the grounding point in each region, on the image. Namely, the distance between the relative position of the point Fi as seen from the mounted position of the rear camera 12 (FIG. 2) and the relative position of the grounding point Hj as seen from the mounted position of the rear camera 12 (FIG. 2) is measured.

Figure 13:
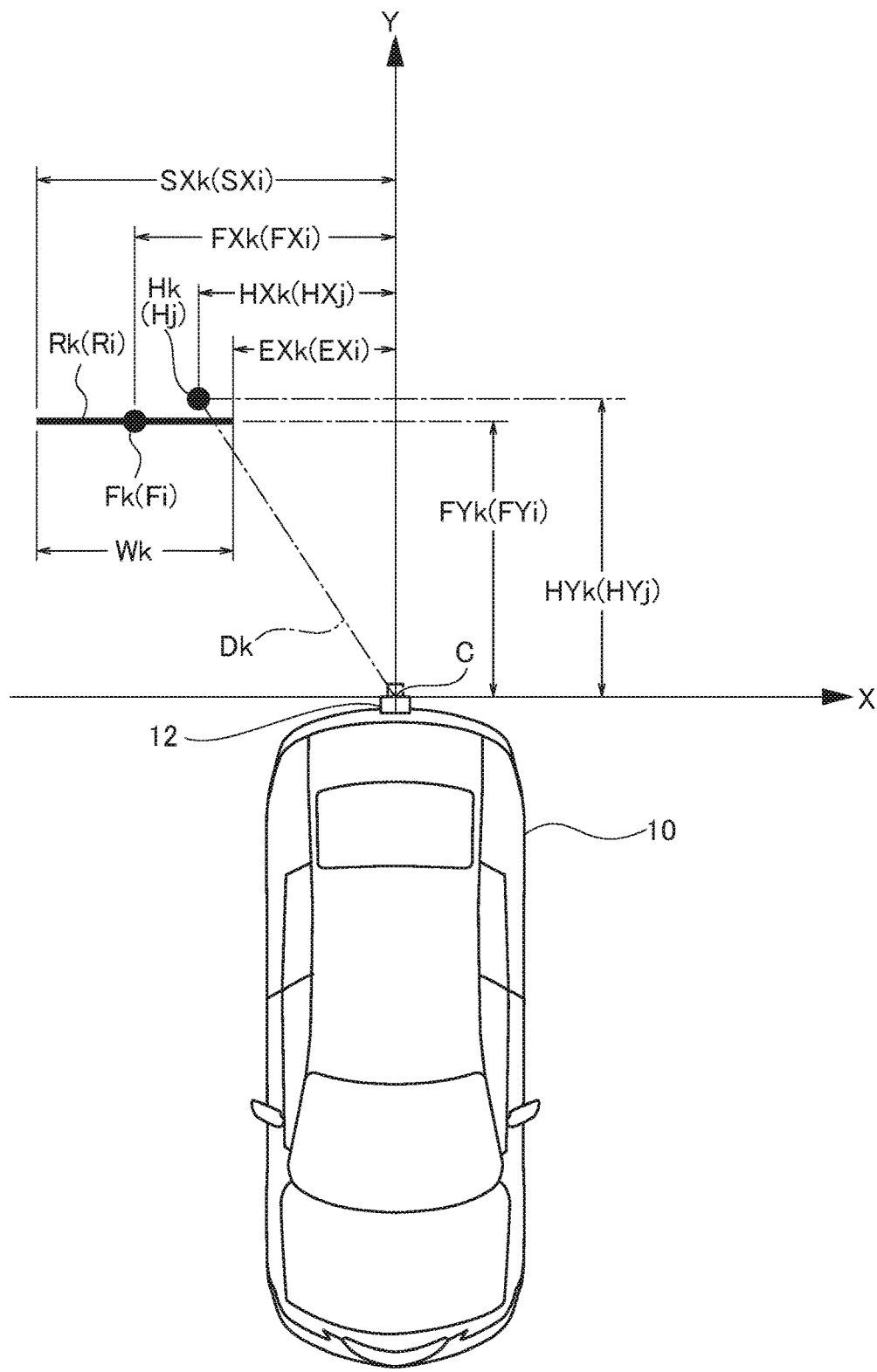
FIG. 13 is a view describing a process of identifying the position of the moving object in Embodiment 1.

For such measurement of the distance, the coordinate of the point Fi and the coordinate of the grounding point Hj are respectively converted into relative coordinates as seen from the rear camera position C (cx, cy), as shown in FIG. 13. Namely, the relative position of the point Fi is calculated as the coordinate value (FXi, FYi) (i=1, 2, . . . ) in the XY coordinate system in which the width direction of the vehicle 10 is set as the X axis and the longitudinal direction of the vehicle 10 is set as the Y axis with the mounted position of the rear camera 12 (FIG. 2) as the origin. The relative position of the grounding point Hj as seen from the rear camera position C (cx, cy) is similarly calculated as the coordinate value (HXj, HYj) (j=1, 2, . . . ) in the XY coordinate system.

The point Fi (fxi, fyi) is converted into the coordinate value (FXi, FYi) and the grounding point Hj (hxj, hyj) is converted into the coordinate value (HXj, HYj) with the focal distance f as the optical parameter of the rear camera 12 and the mounted position (height and depression) of the rear camera 12.

Note that the coordinate value (FXi, FYi) of the point Fi (fxi, fyi) in the XY coordinate system is not entirely coincident with the coordinate value (HXj, HYj) of the grounding point Hj (hxi, hyj) in the XY coordinate system, as shown in FIG. 13. The point Fi (fxi, fyi) is calculated based on the position of the rectangular region Ri including the information on the width and the lateral direction position of the moving object, and the grounding point Hj (hxi, hyi) is calculated based on the position of the grounding point of the moving object. The point Fi (fxi, fyi) and the grounding point Hj (hxi, hyi) are calculated by different calculation. Such the different calculation causes an error in the coordinate values of the points.

The detected object determination part 60 (FIG. 2) obtains the distance between the point Fi and the grounding point Hj, which are converted into the XY coordinate values, and determines the moving object (rectangular region Ri) detected by the movement region detector 54 (first object detector) and the moving object (region Xj') detected by the difference calculator 58 (second object detector) as the same moving object when the distance between the point Fi and the ground point Hi is within a predetermined distance.

When the rectangular region Ri and the region Xj' are determined as the same moving object, the same moving object is integrated with the detection results shown in FIGS. 8 and 11 to be stored in the detected object determination part 60 as new integrated object information. The integrated result is stored with an additional character k as the information that the coordinate value (FXk, FYk) (k=1, 2, . . . ) of the point Fk (Fi) in the XY coordinate system and the coordinate value (HXk, HYk) of the grounding point Hk (Hj) in the XY coordinate system show the same moving object.

The position of the moving object is identified by the moving object position identifying part 62 (FIG. 2). Hereinafter, a process of identifying the position of the moving object will be described with reference to FIG. 13. In FIG. 13, the point Fi and the grounding point Hj are determined as being close to each other, and also determined as the same moving object to be integrated. The information managed by the additional characters i and j before the integration is managed by newly adding a character k.

Coordinate values sxk, exk (k=1, 2, . . . ) of the right and left ends of the rectangular region Rk (Ri) showing each moving object on the image and the XY coordinate value (HXk (HXj), HYk (HYj)) of the grounding point Hk (Hj) (FIG. 13) are retrieved. The coordinate values are the integrated object information stored in the detected object determination part 60 after the determination as the same object in the above-described moving object determination.

Next, the width wk of the moving object on the image is calculated by calculating the difference value of the coordinate values sxk, exk (k=1, 2, . . . ) of the right and left ends of the rectangular region Rk on the image. More specifically, the width wk of the moving object on the image is calculated by wk=exk−sxk (k=1, 2, . . . ).

An actual width Wk (k=1, 2, . . . ) of the moving object is calculated with the coordinate value (HXk, HYk) (k=1, 2, . . . ), the width wk of the moving object on the image, and the focal distance f as the optical parameter of the rear camera 12.

More specifically, the actual width Wk is calculated by Wk=wk×(distance Dk between rear camera position C and grounding point Hk)/f. The distance Dk is calculated by Dk=(HXk2+HYk2)½ with the XY coordinate value (HXk, HYk) of the grounding point Hk (Hj), as shown in FIG. 13.

The calculated distance Dk to the moving object and the actual width Wk of the moving object are stored in the moving object position identifying part 62.

The function of the vehicle behavior controller 80 will be described with reference to FIG. 2. The positional information of the moving object detected by the above-described moving object detection process is sent to a collision determination part 82 shown in FIG. 2.

The collision determination part 82 calculates the risk of the collision of the vehicle 10 to the moving object based on the behavior information (wheel speed and steering angle) of the vehicle 10 and the position information of the moving object. More specifically, the collision determination part 82 calculates the risk of the collision to the moving object when the vehicle 10 moves at the present vehicle speed and the present steering angle based on the actual distance Dk (k=1, 2, . . . ) from the vehicle 10 (rear camera 12) to each moving object and the actual width Wk (k=1, 2, . . . ) of the moving object, which are calculated by the above-described moving object position identifying process.

As a result, when the vehicle 10 has the risk of the collision to the moving object, the security alarm 84 gives warning.

When the vehicle 10 has high risk of the collision to the moving object, the brake controller 86 generates a braking force to the vehicle 10, and forcibly stops the vehicle 10, so as to avoid the collision to the moving object.

Flow of a series of processes that is executed by the vehicle behavior control device 100*a* will be described with reference to the flowchart of FIG. 14 and the functional block diagram of FIG. 2. Hereinafter, each of the processes will be briefly described. The details of each of the processes will be described later.

In Step S10, an image behind the vehicle 10 is obtained by the rear camera 12.

In Step S12, the movement region detector 54 (first object detector) executes the object detection process based on the optical flow.

In Step S14, the bird's-eye view image processor 56 executes the bird's-eye view image generation process.

In Step S16, the difference calculator 58 (second object detector) executes the object detection process based on the difference between the bird's-eye view images.

In Step S18, the detected object determination part 60 executes the detected object determination process.

In Step S20, the moving object position identifying part 62 executes the moving object position identifying process.

In Step S22, the vehicle behavior controller 80 executes the behavior control of the vehicle 10.

In addition, the detailed flow of the process in each step will be described later.

The flow of the object detection process based on the optical flow in Step S12 of FIG. 14 will be described with reference to the flowchart of FIG. 15 and the functional block diagram of FIG. 4.

In Step S30, the plane distortion corrector 54*a* executes the distortion correction process.

In Step S32, the optical flow detector 54*b* executes the optical flow detection process.

In Step S34, the vehicle behavior flow calculator 54*c* executes the vehicle behavior flow calculation process.

In Step S36, the object detector 54*d* executes the extraction process of the optical flow having a direction different from that of the vehicle behavior flow.

In Step S38, the object detector 54d executes the labeling process of the region corresponding to the end point of the extracted optical flow.

In Step S40, the object detector 54d executes the registration process of the rectangular region that has contact with the outside of each of the labeled regions. After that, the flow returns to the main routine (FIG. 14).

Figure 16:
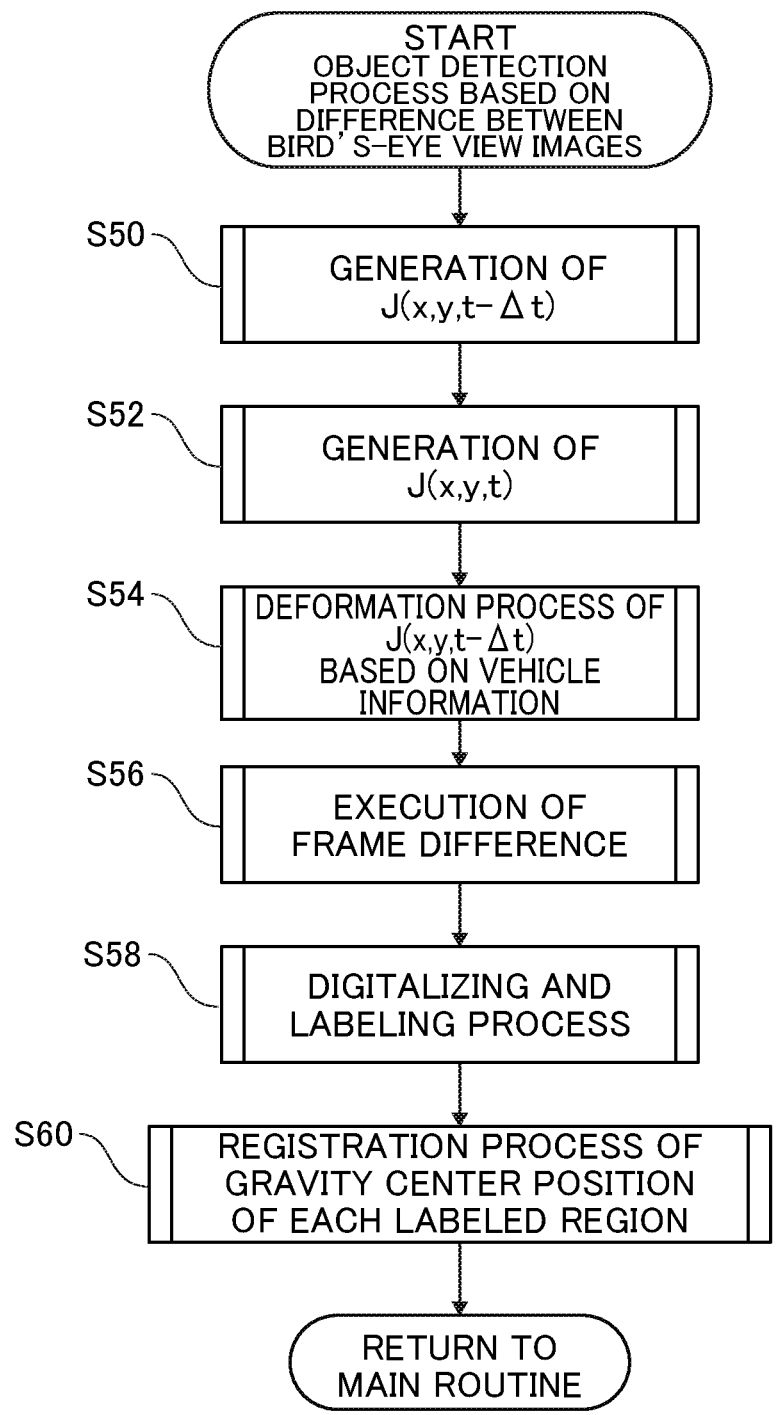
FIG. 16 is a flowchart showing flow of an object detection process, which is shown in the flowchart of FIG. 14, based on the difference between the bird's-eye view images.

The flow of the object detection process based on the difference between the bird's-eye view images in Step S16 of FIG. 14 will be described with the flowchart of FIG. 16 and the functional block diagrams of FIGS. 2 and 9.

In Step S50, the bird's-eye view image processor 56 (FIG. 2) generates the bird's-eye image J (x, y, t−Δt).

In Step S52, the bird's-eye view image processor 56 (FIG. 2) generates the bird's-eye view image J (x, y, t).

In Step S54, the bird's-eye view image alignment part 58a (FIG. 9) deforms the bird's-eye view image J (x, y, t−Δt) based on the vehicle information, and aligns the bird's-eye view image J (x, y, t−Δt) with the bird's-eye view image J (x, y, t).

In Step S56, the difference calculation execution part 58b (FIG. 9) executes the frame difference.

In Step S58, the object detector 58c (FIG. 9) executes the digitizing process and the labeling process to the result of the frame difference.

In Step S60, the object detector 58c (FIG. 9) executes the registration process of the gravity center position of each of the labeled regions. After that, the flow returns to the main routine (FIG. 14).

Figure 17:
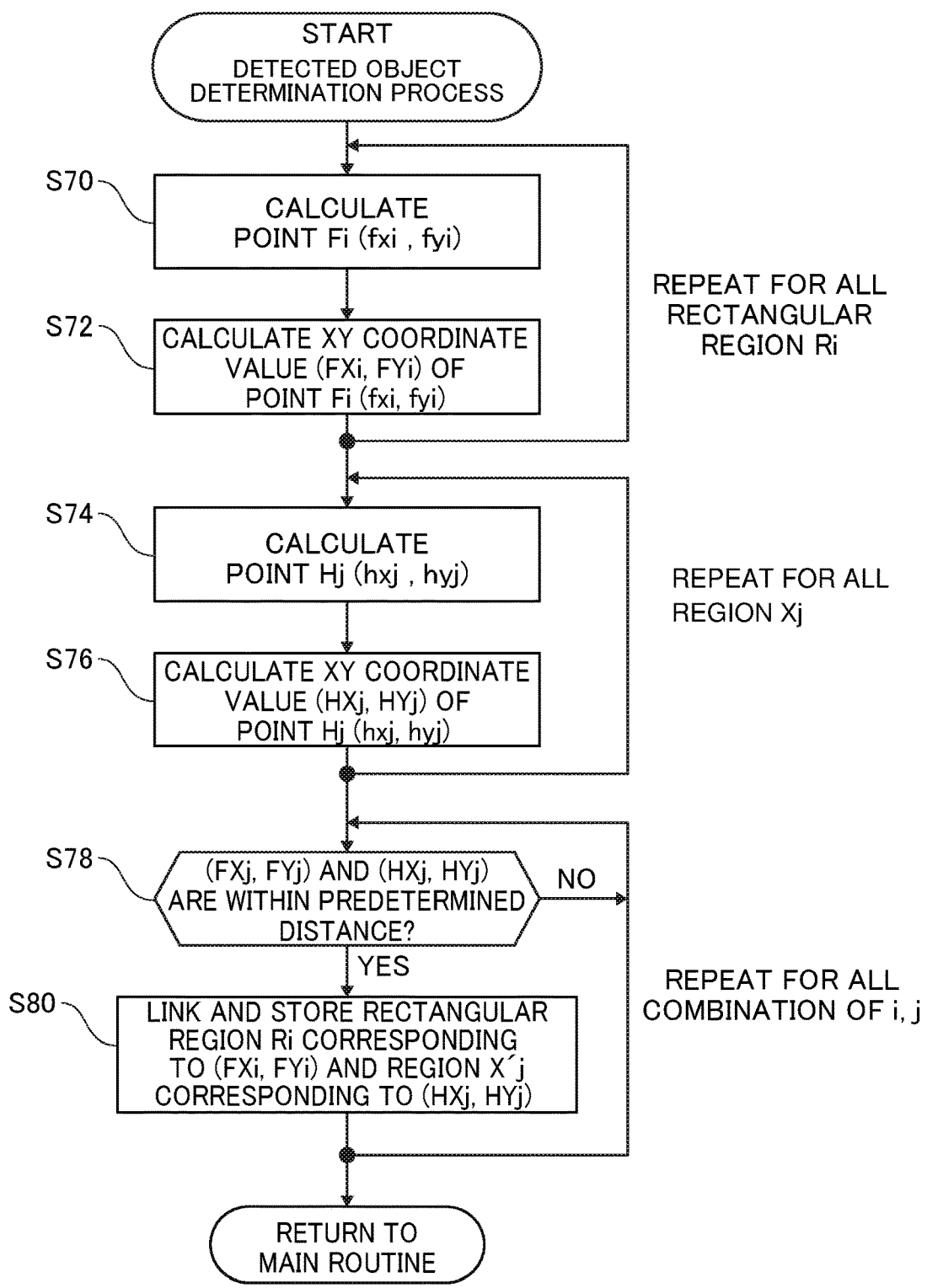
FIG. 17 is a flowchart showing flow of a detected object determination process in the flowchart of FIG. 14.

The flow of the detected object determination process in Step S18 of FIG. 14 will be described with reference to the flowchart of FIG. 17. In addition, the detected object determination part 60 shown in FIG. 2 executes the detected object determination process.

In Step S70, the point Fi (fxi, fyi) (i=1, 2, . . . ) is calculated from the position of each rectangular region Ri (i=1, 2, . . . ) as the position coordinate of the moving object.

In Step S72, the XY coordinate value (FXi, FYi) (i=1, 2, . . . ) of the point Fi (fxi, fyi) (i=1, 2, . . . ) is calculated. In addition, the processes in Steps S70 and S72 are repeated to all of the rectangular regions Ri.

In Step S74, the coordinate value (hxj, hyj) (j=1, 2, . . . ) of the grounding point Hj of the moving object on the image is calculated based on the gravity center position of each region Xj' (j=1, 2, . . . ).

In Step S76, the XY coordinate value (HXj, HYj) (j=1, 2, . . . ) of the coordinate value (hxj, hyj) (j=1, 2, . . . ) of the grounding point Hj on the image, which is the grounding point of the moving object, is calculated. In addition, the processes in Steps S74 and S76 are repeated to all of the regions Xj'.

In Step S78, it is determined whether or not the distance between the coordinate value (FXi, FYi) (i=1, 2, . . . ) and the coordinate value (HXi, HYi) (i=1, 2, . . . ) is within a predetermined distance for all of the combinations of the additional characters i and j. In the case of YES, the process proceeds to Step S80. In the case of NO, the region to be determined is changed, and the process in Step S78 is repeated.

In Step S80, it is determined that the rectangular region Ri corresponding to the coordinate value (FXi, FYi) and the region Xj' corresponding to the coordinate value (HXj, HYj) are the same moving object to link the two detection results. The XY coordinate value (FXi, FYi) (j=1, 2, . . . ) and the XY coordinate value (HXj, HYj) (j=1, 2, . . . ) are stored. In addition, the processes in Steps S78 and S80 are repeated to all of the detected moving objects. In this case, the rectangular region Ri and the region Xj' determined as the same moving object are linked and stored with the additional character k (k=1, 2, . . . ) as the regions showing that the rectangular region Rk (Ri) and the region Xk' (Xj') are the same moving object. Namely, the coordinate value (FXi, FYi) representing the rectangular region Ri is stored as the coordinate value (FXk, FYk), and the coordinate value (HXj, HYj) representing the region Xj' is stored as the coordinate value (HXk, HYk). After that, the flow returns to the main routine (FIG. 14).

The flow of the moving object position identifying process in Step S20 of FIG. 14 will be described with reference to the flowchart of FIG. 18. The moving object position identifying part 62 shown in FIG. 2 executes the moving object position identifying process.

In Step S90, the information on the moving object determined as the same moving object by the detected object determination process is retrieved.

In Step S92, the detection result of the movement region detector 54 (first object detector) and the detection result of the difference calculator 58 (second object detector), which show the same moving object, are obtained.

In Step S94, the coordinate values sxk, exk of the right and left ends of the rectangular region Rk and the XY coordinate value (HXk, HYk) of the grounding point Hk are retrieved.

In Step S96, the width wk of the moving object on the image is calculated based on the coordinate values sxk, exk.

In Step S98, the actual width Wk of the moving object is calculated based on the coordinate value (HXk, HYk) and the width wk of the moving object on the image. In this case, the distance Dk to the moving object is also calculated.

In Step S100, the actual width Wk of the moving object, the distance Dk to the moving object, and the XY coordinate value (HXk, HYk) are registered as the position information on the detected moving object. The processes from Steps S90 to S100 are executed for all of the additional characters k (k=1, 2, . . . ). After that, the flow returns to the main routine (FIG. 14).

Embodiment 2

Another embodiment of a vehicle behavior control device using the external environment recognizing device for a vehicle according to the present invention will be described with reference to the drawings.

In Embodiment 2, the present invention is applied to a vehicle behavior control device that detects a moving object behind a vehicle and stops the vehicle with a braking force when the vehicle is at risk of a collision to the moving object in reverse parking.

Figure 19:
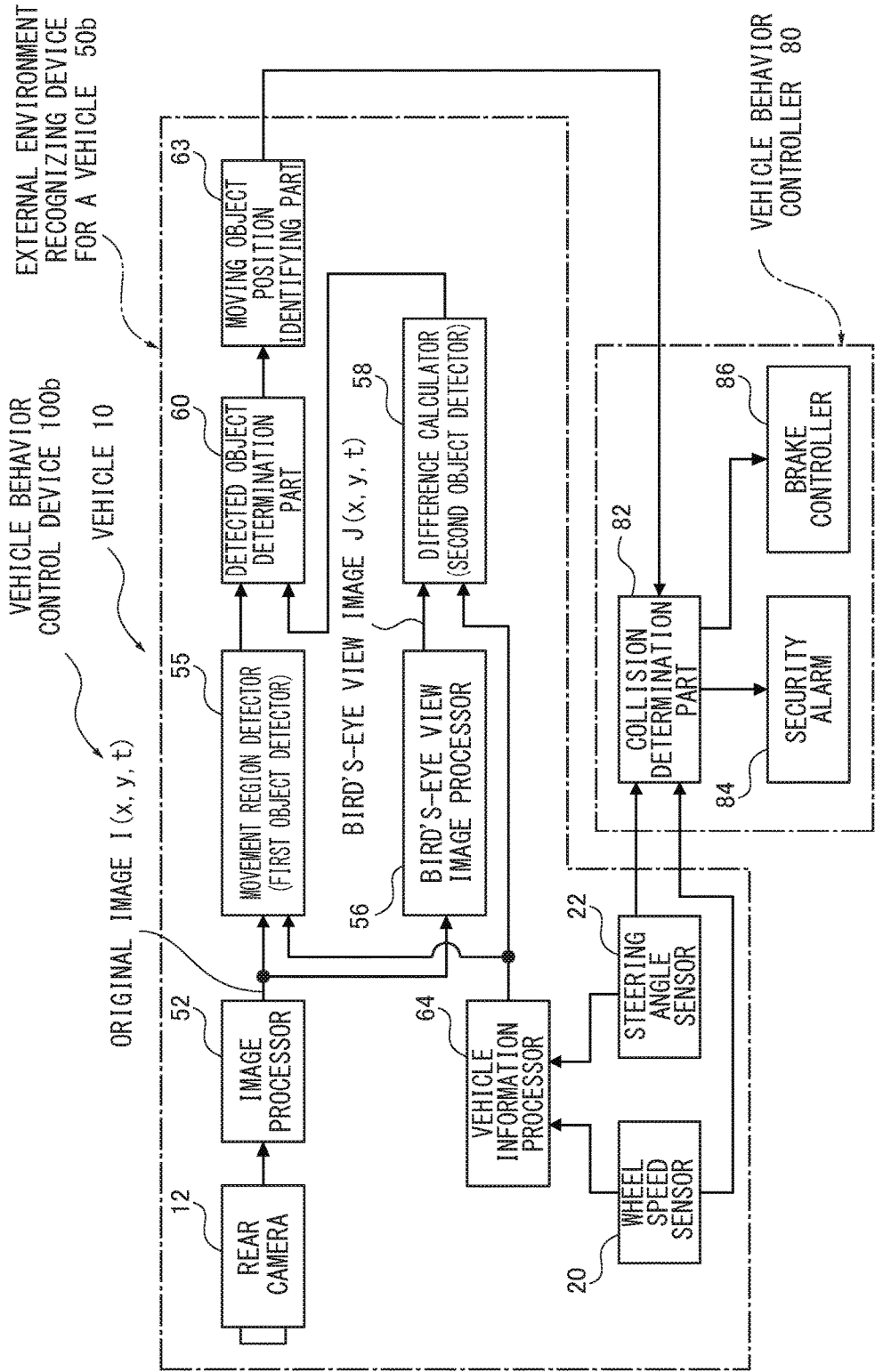
FIG. 19 is a functional block diagram showing a configuration of a vehicle behavior control device using an external environment recognizing device for a vehicle according to Embodiment 2.

FIG. 19 is a functional block diagram showing a configuration of a vehicle behavior control device 100b according to Embodiment 2. The vehicle behavior control device 100b includes an external environment recognizing device for a vehicle 50b instead of the external environment recognizing device for a vehicle 50a (FIG. 2) in the above-described vehicle behavior control device 100a.

The internal configuration of the external environment recognizing device for a vehicle 50b is substantially the same as the internal configuration of the external environment recognizing device for a vehicle 50a. However, the internal configuration of a movement region detector 55 (first moving detector) and the internal configuration of a moving object position identifying part 63 differ from those in the external environment recognizing device for the vehicle 50a. Hereinafter, the internal configurations of the movement region detector 55 and the moving object position identifying part 63 will be only described. In addition, as the function of the other configurations is similar to those in Embodiment 1, the detailed description thereof will be omitted.

Figure 20:
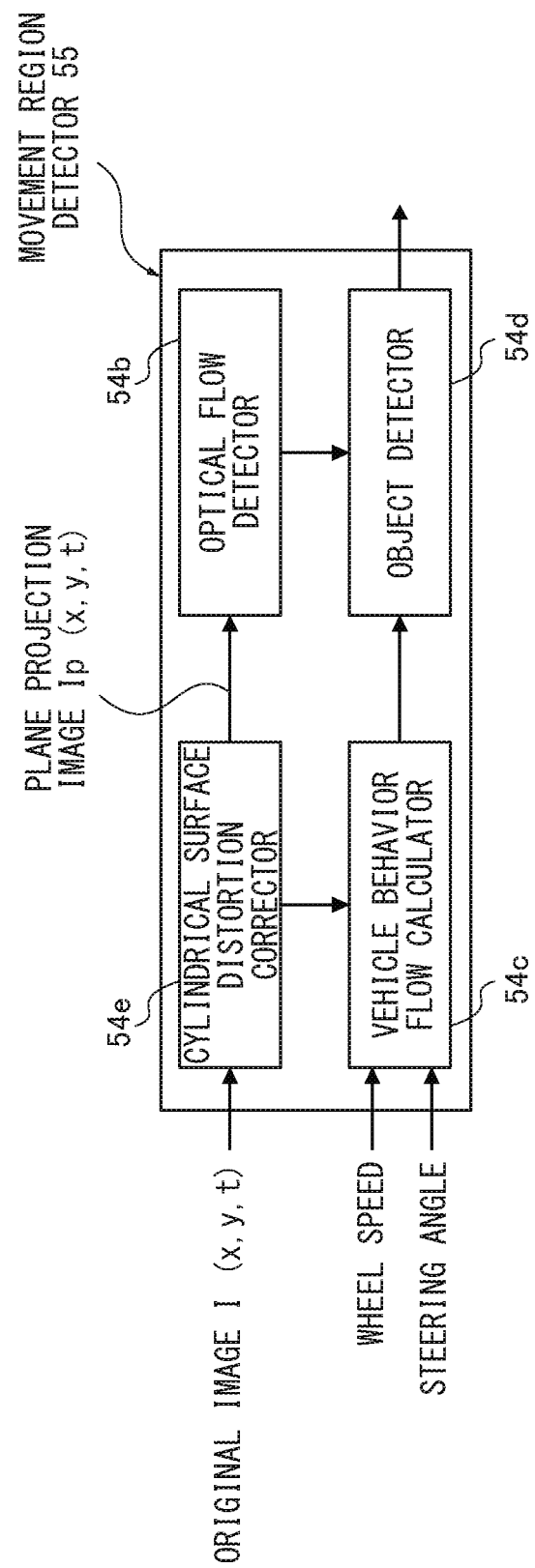
FIG. 20 is a functional block diagram showing a detailed configuration of a movement region detector (first object detector) in Embodiment 2.

FIG. 20 is a functional block diagram showing the details of the internal configuration of the movement region detector 55 (first object detector) installed in the vehicle behavior control device 100*b*. The movement region detector 55 includes a cylindrical surface distortion corrector 54*e* that changes the original image I (x, y, t) into a cylindrical surface projection image Ic (x, y, t) (projection image) projected on a virtual cylindrical surface vertically provided on a road surface, an optical flow detector 54*b* that detects optical flow from the cylindrical surface projection image Ic (x, y, t) generated from the original image captured at the time t and the cylindrical surface projection image Ic (x, y, t−Δt) generated from the original image captured at the time t−Δt, a vehicle behavior flow calculator 54*c* that calculates optical flow which is assumed to generate along with the movement of the vehicle 10 during the time Δt based on the wheel speed and the steering angle of the vehicle 10 from the time t−Δt to the time t, and an object detector 54*d* that detects the moving object based on the optical flow detected by the optical flow detector 54*b* and the optical flow calculated by the vehicle behavior flow calculator 54*c*.

Figure 5C:
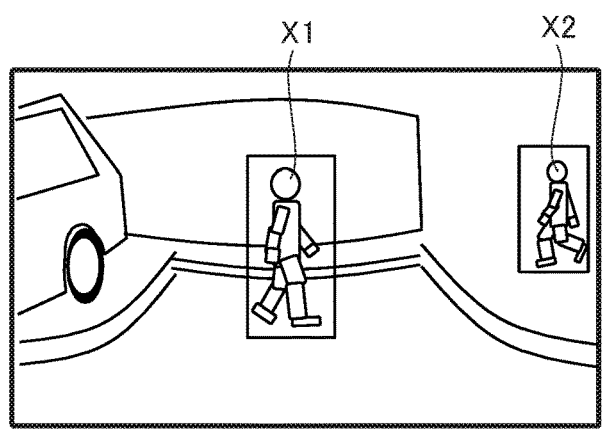
FIG. 5C is a view showing a cylindrical surface projection image into which the original image shown in FIG. 5A is converted.

The cylindrical surface distortion corrector 54*e* eliminates the distortion in the original image I (x, y, t) to correct the original image. More specifically, the original image I (x, y, t) is projected on the virtual cylindrical surface which vertically rises from the road surface, and is formed on a circular arc having the focal position of the rear camera 12 as the center, and generates the cylindrical surface projection image Ic (x, y, t) shown in FIG. 5C. The distortion in the original image I (x, y, t) is eliminated by the projection process to the virtual cylindrical surface, so that the pedestrian X2 is converted into a upstanding pedestrian, as shown in FIG. 5C. The position and the width of the pedestrian are accurately identified by detecting the pedestrian from the cylindrical surface projection image Ic (x, y, t).

In the vehicle behavior control device 100*a* in Embodiment 1, the plane projection image Ip (x, y, t) is generated by the similar projection process. As shown in FIGS. 5B and 5C, the distortion is eliminated by either of the projection processes, and the image showing the upstanding pedestrian is obtained. The magnification for projection on the virtual plane differs between the cylindrical surface projection image Ic (x, y, t) shown in FIG. 5C and the plane projection image Ip (x, y, t) shown in FIG. 5B. The pedestrian is thus projected in the edge portion of the cylindrical surface projection image Ic (x, y, t) to be smaller than that in the plane projection image Ip (x, y, t). However, due to the projection on the cylindrical surface, the shape of the moving object in the up and down direction is maintained, and the pedestrian is thus corrected with its shape being maintained. Namely, the detection performance of the pedestrian is maintained. The positions of the feet of the pedestrians differ between FIGS. 5B and 5C. Such a difference occurs based on a difference in the projection methods. The distance between the vehicle and the moving object is calculated based on the bird's-eye view image generated from the original image. The detection performance of the moving object is thus maintained.

More specifically, the distortion of the original image is corrected by either of the plane projection described in Embodiment 1 and the cylindrical surface projection described in Embodiment 2. As the actual projection process is executed with the prepared distortion correction table, both of the projection methods require the same process time. In addition, when the cylindrical surface projection is used, information having a view wider than that of the plane projection is imaged. It is thus preferable for application which requires wider view information to use the cylindrical surface projection A process of identifying a position of a moving object that is executed in the moving object position identifying part 63 will be described based on a difference between Embodiment 1 and Embodiment 2. As the result of the above moving object determination, the coordinate values sxk, exk (k=1, 2, . . . ) at the right and left ends of the rectangular region Rk showing each moving object and the XY coordinate value (HXk, HYk) (k=1, 2, . . . ) of the grounding point HK are retrieved. These coordinate values are determined as the same moving object, and stored in the detected object determination part 60.

Next, the actual positions of the moving object at the right and left ends SXk, EXk (k=1, 2, . . . ) are calculated based on the coordinate value HYk (k=1, 2, . . . ) of the grounding point Hk in the Y direction and the coordinate values sxk, exk (k=1, 2, . . . ) of the right and left ends of the rectangular region Rk (FIG. 13).

The actual positions SXk, EXk (k=1, 2, . . . ) of the moving object at the right and left ends are calculated based on the coordinate value HYk (k=1, 2, . . . ) of the grounding point Hk of the moving object in the Y direction and the focal distance f as the optical parameter of the rear camera 12. More specifically, the actual positions are calculated by SXk=sxk*HYk/f and EXk=exk*HYk/f, for example.

The actual lateral direction position FXk (k=1, 2, . . . ) of the moving object is calculated as the center of the positions SXk, EXk at the right and left ends based on the actual positions SXk, EXk (k=1, 2, . . . ) of the moving object at the right and left ends calculated as described above. The actual width Wk of the moving object is also calculated, and the distance Dk to the moving object is also calculated.

More specifically, FXk and Wk are calculated by FXk=(SXk+EXk)/2 and Wk=EXx−SXk, respectively. The distance Dk is calculated with the coordinate value (HXk, HYk) as described in Embodiment 1.

The actual width Wk of the moving object, the distance Dk to the moving object, and the coordinate value (FXk, FYk) (k=1, 2, . . . ) showing the position of the moving object, which are calculated as described above, are stored in the moving object position identifying part 63.

More specifically, the actual width of the moving object is calculated based on the positions of the moving object at the right and left ends on the image and the position coordinate of the grounding point of the moving object in Embodiment 2 while the actual width of the moving object is calculated based on the position coordinate of the grounding point of the moving object and the width of the moving object on the image in Embodiment 1. The position of the moving object is reliably identified by either of the processes. However, the process described in Embodiment 2, which uses the positions of the moving object at the right and left ends further, improves the positional accuracy of the moving object in the lateral direction.

Figure 14:
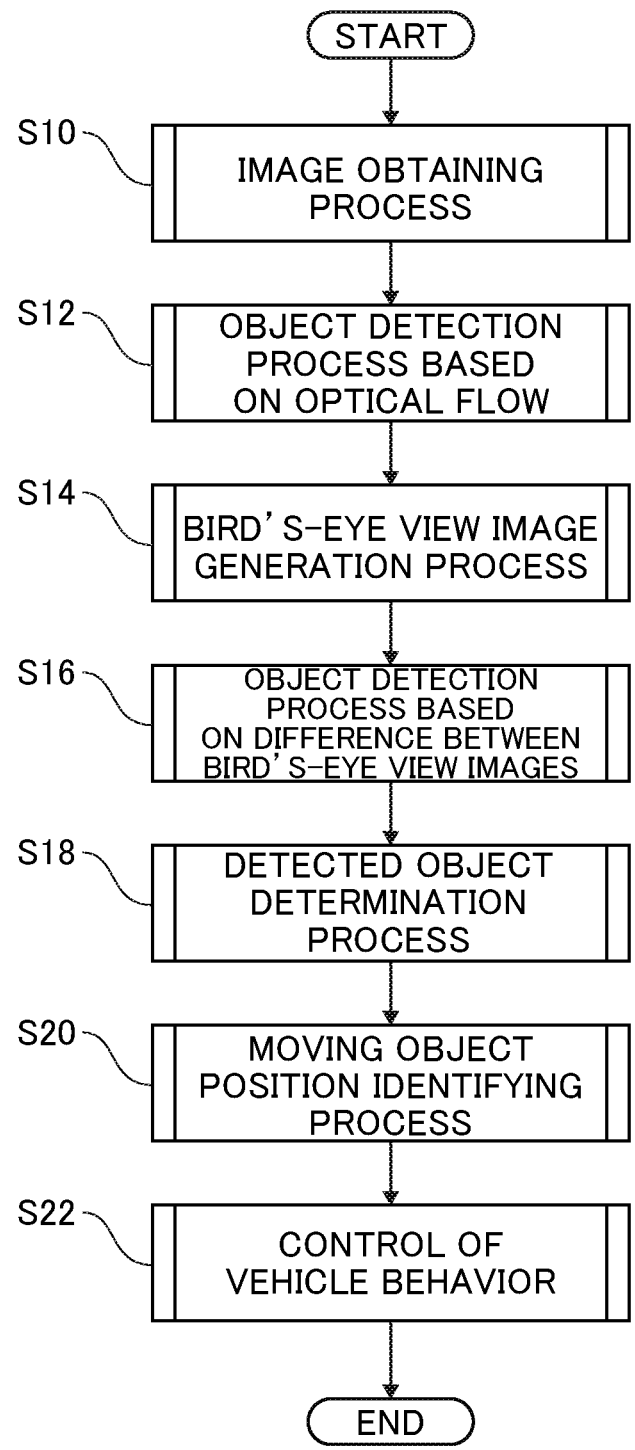
FIG. 14 is a flowchart showing flow of overall processes in the vehicle behavior control device in Embodiment 1.
Figure 15:
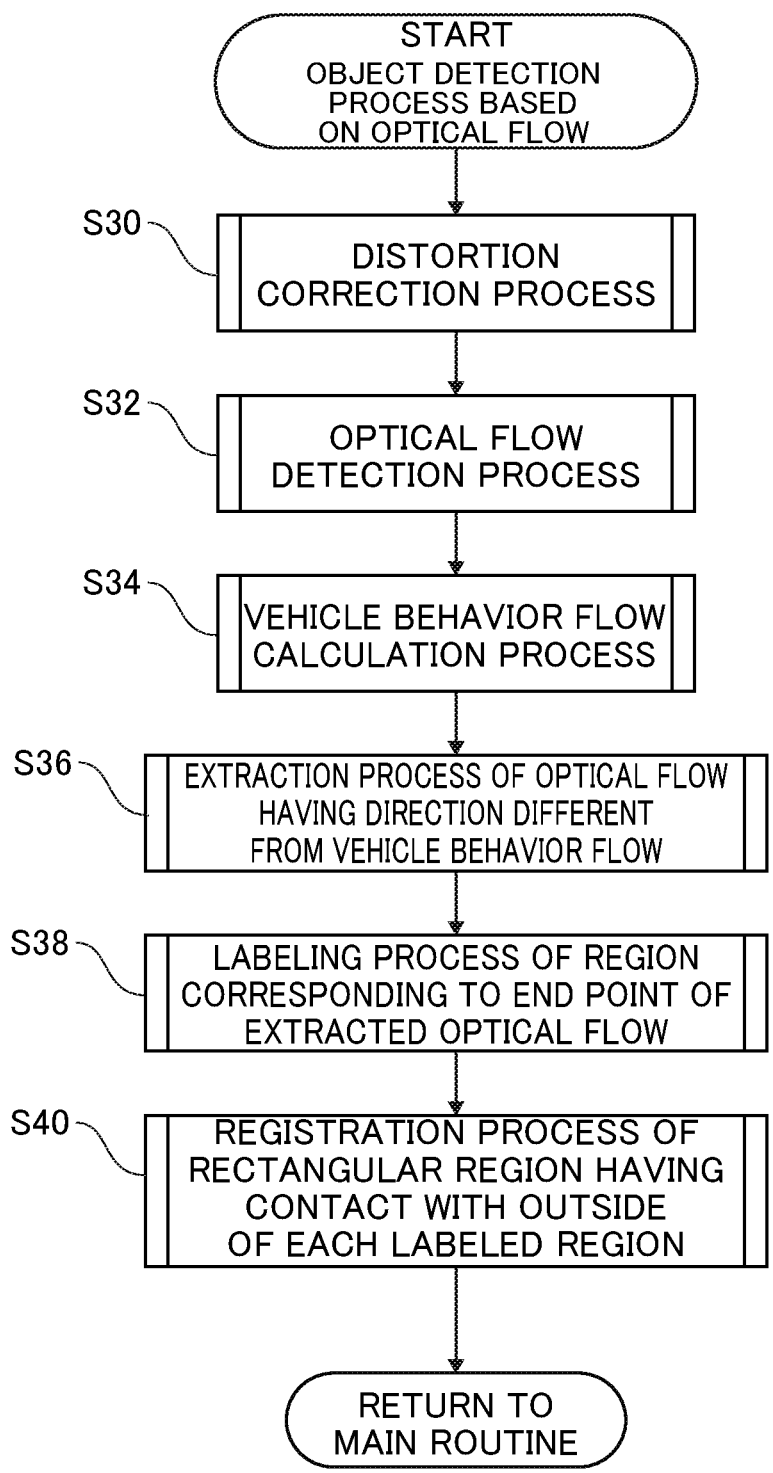
FIG. 15 is a flowchart showing flow of an object detection process, which is shown in the flowchart of FIG. 14, based on the optical flow.

A series of processes in the vehicle behavior control device 100*b* is executed substantially similar to the flowchart of FIG. 14. Namely, although FIG. 14 is the flowchart showing the flow of the processes in the vehicle behavior control device 100*a*, FIG. 14 is also used for showing the general flow of the processes in the vehicle behavior control device 100*b* in Embodiment 2. Hereinafter, the main routine of Embodiment 2 will be thus described with reference to FIG. 14.

As the outline of each process shown in FIG. 14 is as described in Embodiment 1, the description thereof will be omitted, and description different from Embodiment 1 will be only described below.

In Embodiment 2, the flow of the object detection process based on the optical flow in Step S12 of FIG. 14 is the same as that in Embodiment 1. However, only the distortion correction process (Step S30 of FIG. 15) differs from that in Embodiment 1.

In Embodiment 2, the cylindrical surface distortion corrector 54*e* shown in FIG. 20 corrects the distortion of the original image I (x, y, t) by the cylindrical surface projection.

Figure 18:
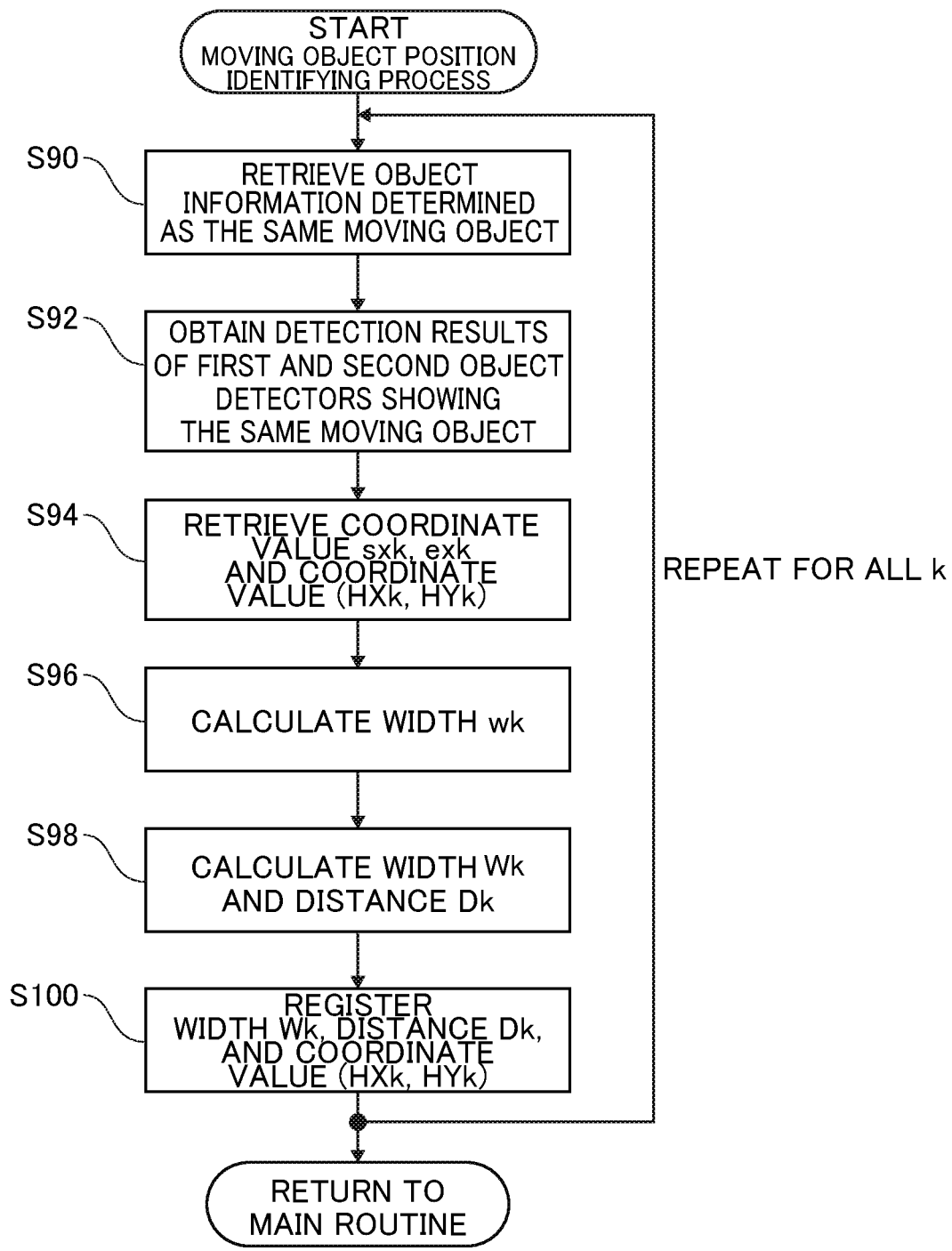
FIG. 18 is a flowchart showing flow of a moving object position identifying process in the flowchart of FIG. 14.
Figure 21:
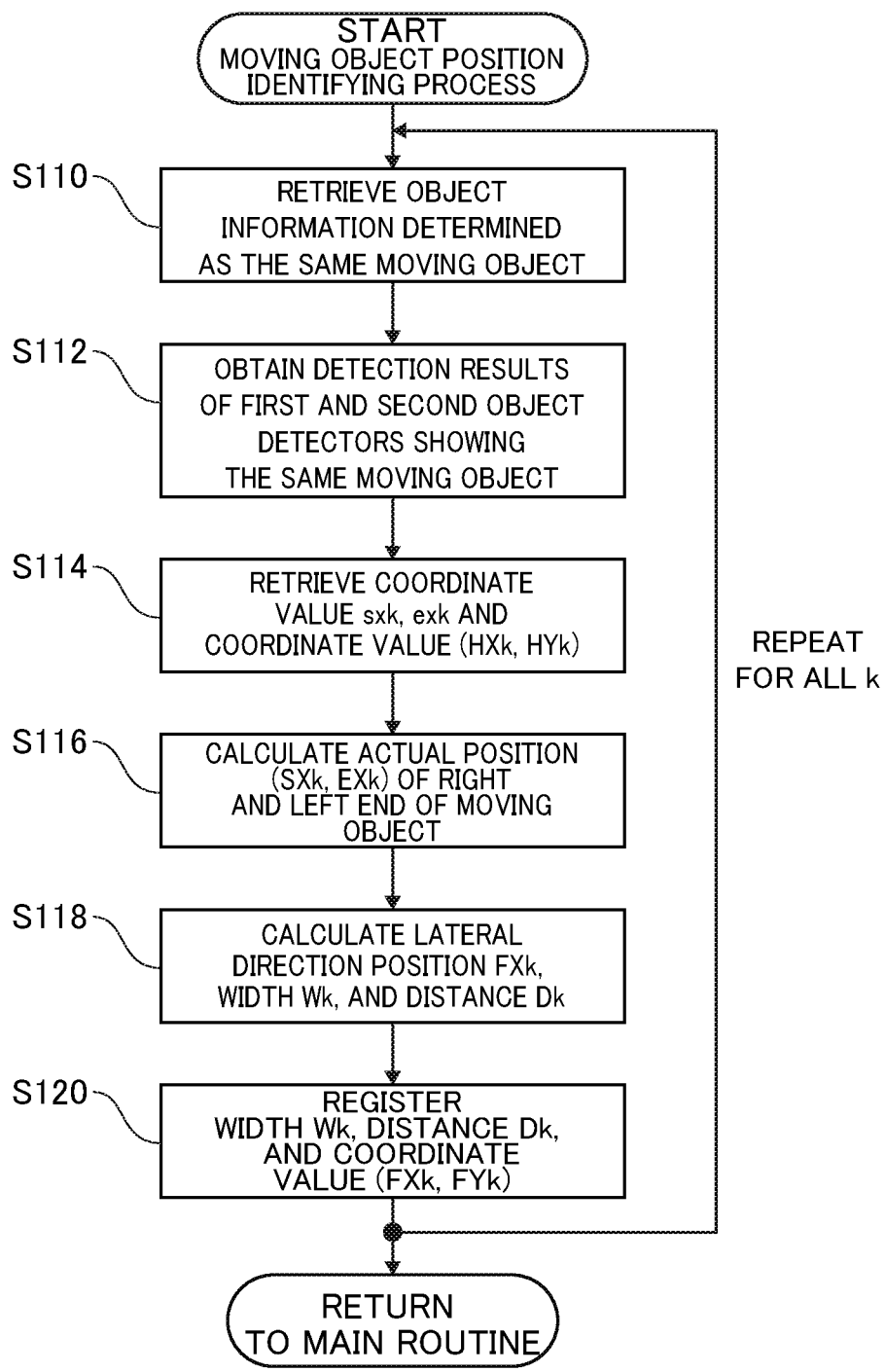
FIG. 21 is a flowchart showing flow of a moving object position identifying process in Embodiment 2.

The flow of the moving object position identifying process in Step S20 of FIG. 14 differs from that in Embodiment 1 (FIG. 18). The flow is thus described with the flowchart of FIG. 21. The moving object position identifying part 63 shown in FIG. 19 executes the moving object position identifying process.

In Step S110, the information on the moving object determined as the same moving object by the detected object determination process is retrieved.

In Step S112, the detection result of the movement region detector 54 (first object detector) and the detection result of the difference calculator 58 (second object detector) are obtained. Both of the detection results show the same moving object.

In Step S114, the coordinate values sxk, exk of the right end left ends of the rectangular region Ri and the XY coordinate value (HXk, HYk) (k=1, 2, . . . ) of the grounding point Hk are retrieved.

In Step S116, the actual positions SXk, EXk (k=1, 2, . . . ) of the right and left ends of the moving object are calculated based on the coordinate value (HXk, HYk) and the coordinate values sxk, exk.

In Step S118, the lateral direction position FXk (k=1, 2, . . . ) of the moving object and the actual width Wk of the moving object are calculated. In this case, the distance Dk to the moving object is also calculated.

In Step S120, the actual width Wk of the moving object, the distance Dk to the moving object, and the coordinate value (FXk, FYk) (k=1, 2, . . . ) showing the position of the moving object are registered as the positional information on the detected moving object. The processes from Step S110 to Step S120 are executed for all of the additional characters k (k=1, 2, . . . ). After that, the flow returns to the main routine (FIG. 14).

Embodiment 3

Another embodiment of a vehicle behavior control device using the external environment recognizing device for a vehicle according to the present invention will be described with reference to the drawings.

In Embodiment 3, the present invention is applied to a vehicle behavior control device that detects a moving object behind a vehicle, and stops the vehicle with a braking force when the vehicle is at risk of a collision to a moving object in reverse parking.

Figure 22:
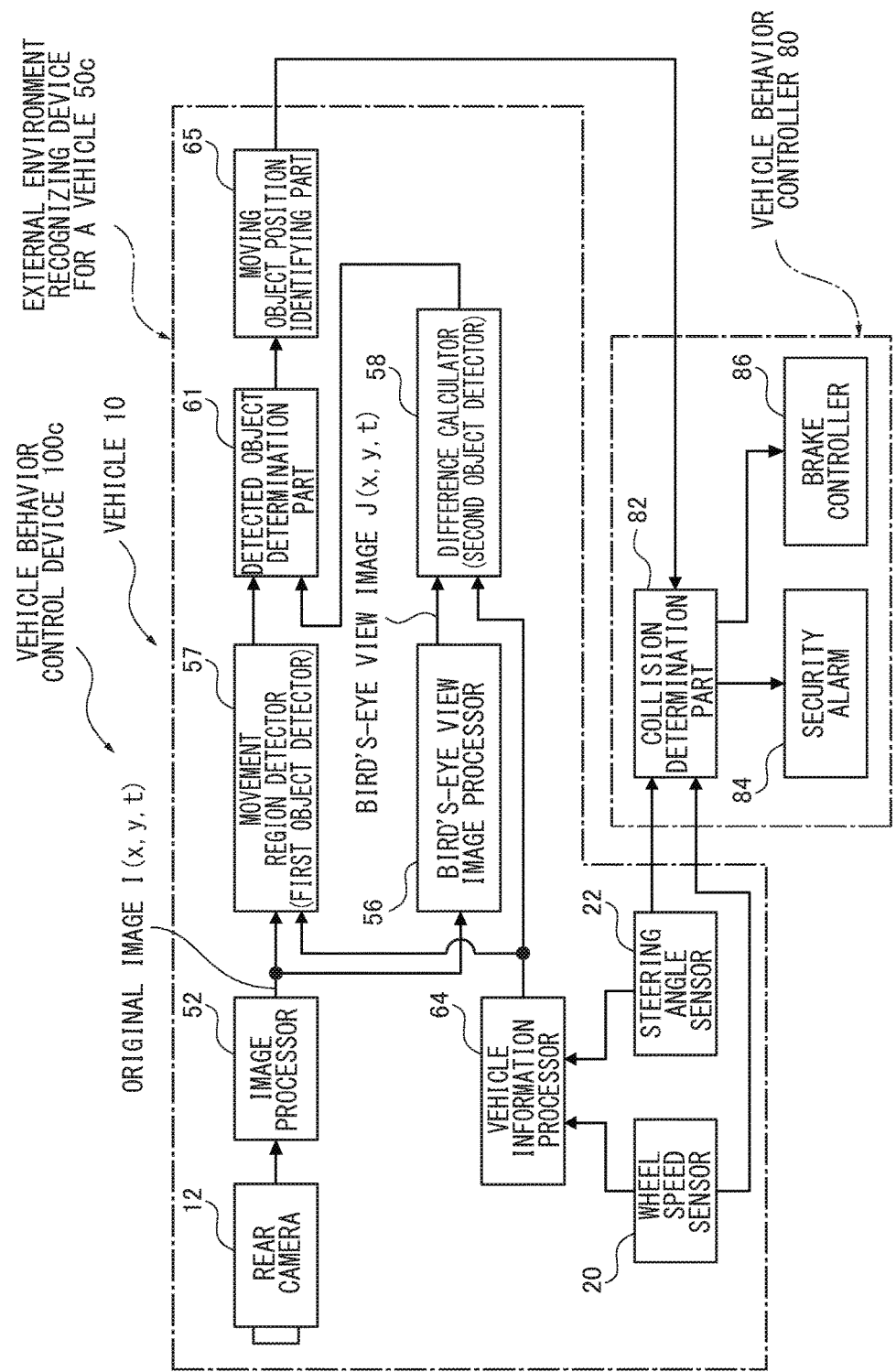
FIG. 22 is a functional block diagram showing a configuration of a vehicle behavior control device using an external environment recognizing device for a vehicle according to Embodiment 3.

FIG. 22 is a functional block diagram showing the configuration of a vehicle behavior control device 100*c* according to Embodiment 3. The vehicle behavior control device 100*c* includes an external environment recognizing device for a vehicle 50*c* and the vehicle behavior controller 80. The vehicle behavior control device 100*c* differs from the above-described vehicle behavior control devices 100*a* and 100*b* in the internal configuration of a movement region detector 57 (first object detector), the internal configuration of a detected object determination part 61, and the internal configuration of a moving object position identifying part 65. Hereinafter, the internal configurations of the movement region detector 57, the detected object determination part 61, and the moving object position identifying part 65 will be only described. As the function of the other configurations is similar to that described in Embodiment 1, the description thereof will be omitted.

The movement region detector 57 (first object detector) detects the moving object from the original images I (x, y, t−Δ) and I (x, y, t).

Figure 23:
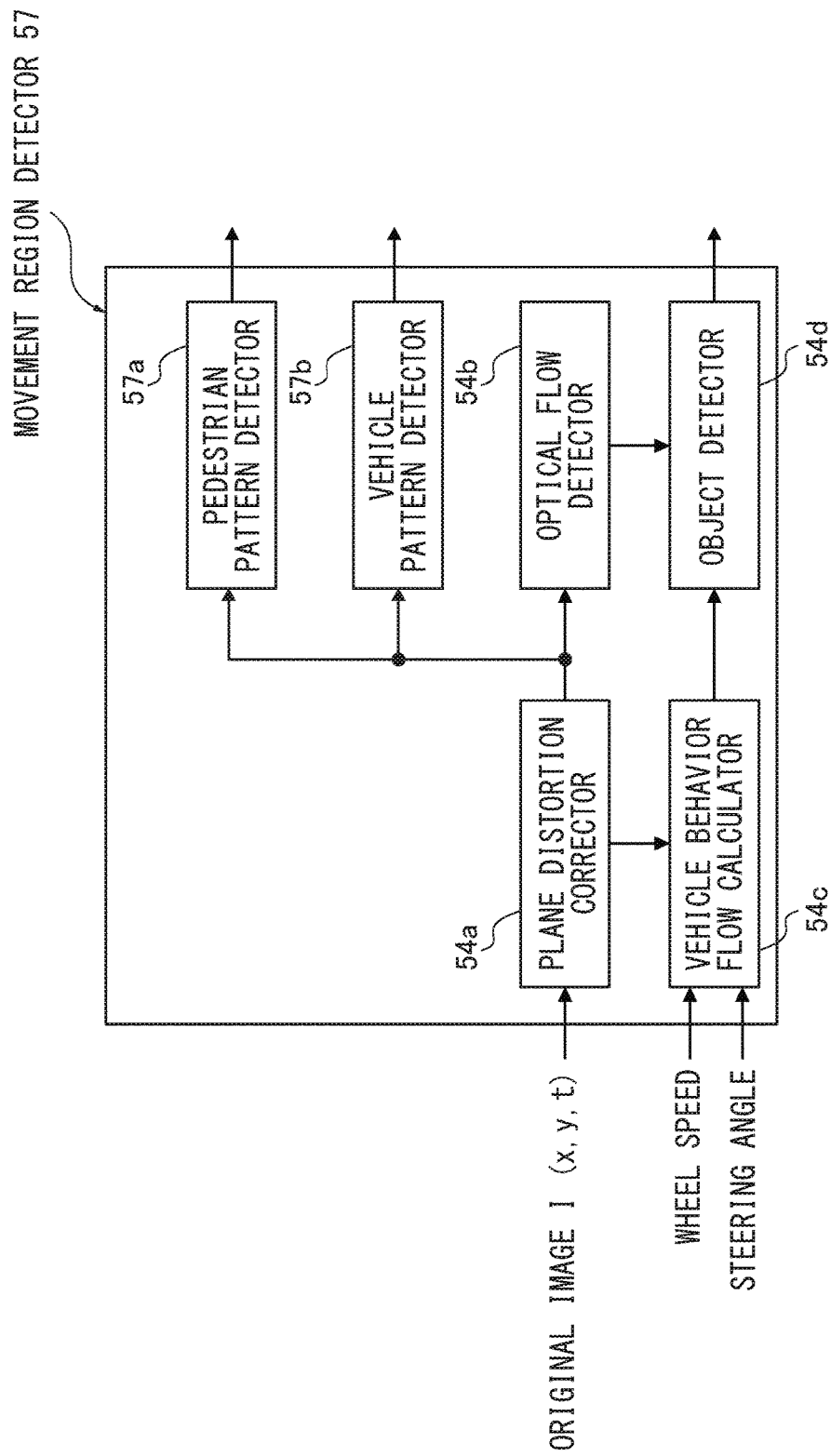
FIG. 23 is a functional block diagram showing a detailed configuration of a movement region detector (first object detector) in Embodiment 3.

FIG. 23 is a functional block diagram showing the detailed internal configuration of the movement region detector 57 (first moving object). The movement region detector 57 includes, in addition to the configurations of the movement region detector 54 in Embodiment 1, a pedestrian pattern detector 57*a* that detects a pedestrian with pattern matching from the original image I (x, y, t) and a vehicle pattern detector 57*b* that detects a vehicle with pattern matching from the original image I (x, y, t). The type of the moving object detected from the original image I (x, y, t) is thereby identified with the configurations, so as to improve the detection accuracy of the distance to the moving object. The details will be described later.

The detected object determination part 61 determines whether or not the moving object detected by the movement region detector 57 (first object detector) is the same as the moving object detected by the difference calculator 58 (second object detector). Embodiment 3 differs from Embodiments 1, 2 in that both of the detection results of the pedestrian pattern detector 57*a* and the vehicle pattern detector 57*b* are referred as the moving object detected by the movement region detector 57 (first object detector).

The moving object position identifying part 65 identifies the position of the detected moving object. Embodiment 3 differs from Embodiments 1, 2 in that the method of calculating a distance to a moving object is changed according to the type of the detected moving object. The details will be described later.

A process of detecting a pedestrian pattern and a vehicle pattern from the original image I (x, y, t) will be described. The movement region detector 57 (first object detector) executes this process.

The pedestrian pattern is distinguished from the vehicle pattern with general pattern matching. Any method such as template matching, pattern discrimination with Histograms of Oriented Gradients (HOG), and pattern discrimination with a neural network may be used.

It is preferable to use a low-resolution pyramid image, which is generated from the original image I (x, y, t), for effective pattern matching.

The detected pedestrian pattern and vehicle pattern are stored in the movement region detector 57 with a format similar to the format of the moving object detected based on the optical flow. To be specific, the coordinate of the upper left vertex (sxi, syi) and the coordinate of the lower right vertex (exi, eyi) in each rectangular region are stored together with the number of the rectangular region Ri (i=1, 2, . . . ) which has contact with the outside of the detected pedestrian pattern or vehicle pattern. In this case, the coordinate of the point Fi (FIG. 7) representing the position of the moving object may be calculated to be stored.

The detected object determination part 61 identifies whether or not the detected moving objects are the same moving object with the detection results of the pedestrian pattern and the vehicle pattern, in addition to the detection result of the moving object based on the optical flow and the detection result of the moving object by the difference between the bird's-eye view images. The detailed flow of the process will be described below.

The moving object position identifying part 65 identifies the position of the moving object determined as the same moving object by the detected object determination part 61. In this case, the method of measuring a distance to a moving object is changed according to the detected moving object such as a pedestrian or a vehicle.

More specifically, when the detected moving object is a vehicle, the distance to the moving object is calculated based on the detection result of the optical flow detector 54b (FIG. 23). When the detected moving object is a pedestrian, the distance to the moving object is calculated based on the detection result of the difference calculator 58 (FIG. 22).

When the moving object (overhung moving object) such as the vehicle in which the grounding point (wheel) having contact with the road surface differs from the close point (bumper) closest to the rear camera 12 is detected, the grounding point calculated based on the difference result of the bird's-eye view images (for example, H1 (hx1, hy1) in FIG. 12C) does not always show the distance to the moving object.

Figure 24A:
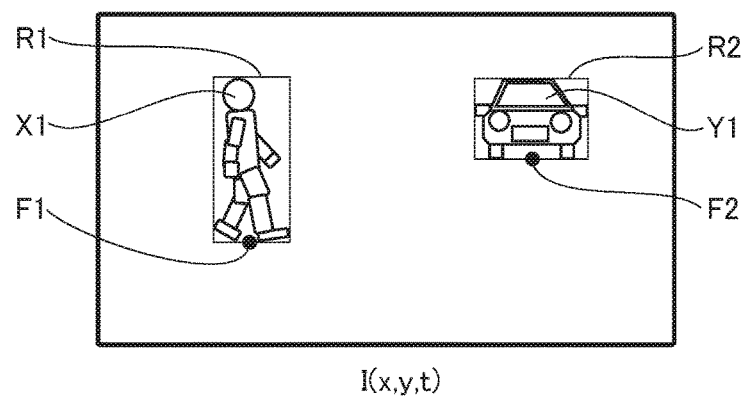
FIG. 24A is a view showing one example of an original image obtained in Embodiment 3.

An example in which the grounding point differs from the close point will be described with reference to FIGS. 24A to 24C. FIG. 24A shows one example of the original image I (x, t, t) obtained by the rear camera 12. The original image I (x, y, t) includes the pedestrian X1 and another vehicle Y1. The rectangular region R1 as the moving object detected based on the optical flow and the point F1 representing the position of the moving object are superimposed with the pedestrian X1. The rectangular region R2 as the moving object detected based on the optical flow and the point F2 representing the position of the moving object are superimposed with another vehicle Y1.

Figure 24B:
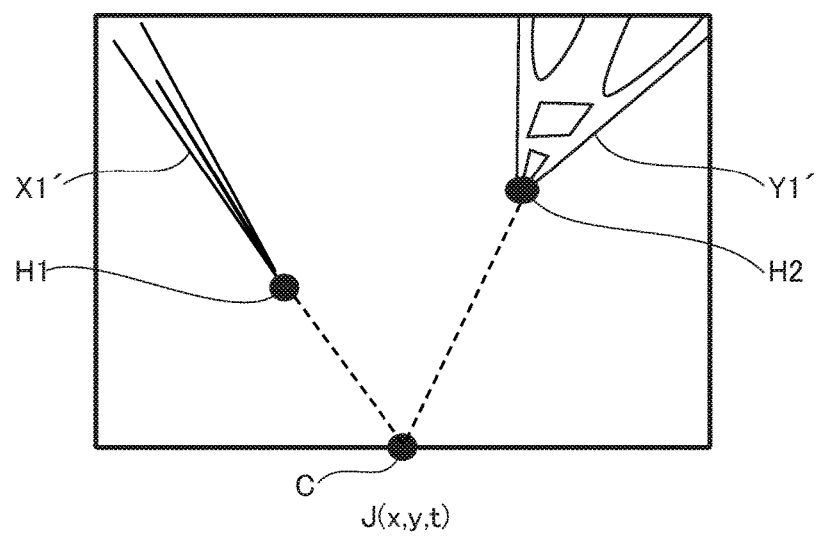
FIG. 24B is a view showing a bird's-eye view image generated from the original image in FIG. 24A.
Figure 24C:
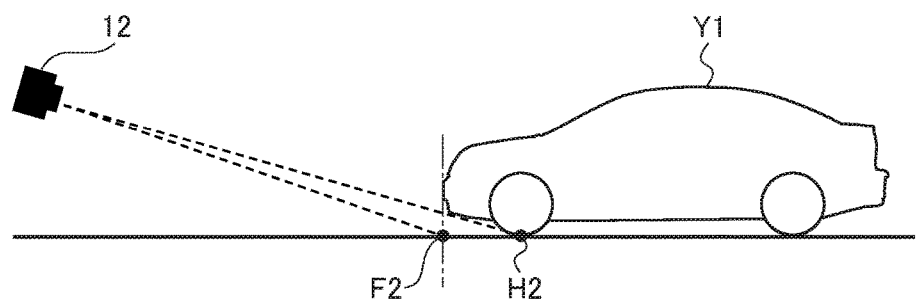
FIG. 24C is a view showing a positional relationship between a vehicle and a rear camera shown in FIG. 24A.

FIG. 24B shows an example in which the original image I (x, y, t) is converted into the bird's-eye view image J (x, y, t). The pedestrian X1 is converted into a region X1', and another vehicle Y1 is converted into a region Y1'. A grounding point H1 is detected from the region X1' into which the pedestrian X1 is converted, and a grounding point H2 is detected from the region Y1' into which another vehicle Y1 is converted.

The distance from the rear camera position C to the region X1' is calculated as the distance from the vehicle 10 to the pedestrian X1. The distance from the rear camera position C to the grounding point H2 of the region Y1' is calculated as the distance from the vehicle 10 to another vehicle Y1.

In this case, the point F1 and the grounding point H1 detected from the pedestrian X1 show the same point. On the other hand, the point F2 and the grounding point H2 detected from another vehicle Y1 show different points. As shown in FIG. 24C, the point F2 shows the position of the front end of the bumper of another vehicle Y1 while the grounding point H2 shows the position of the grounding point of the wheel of another vehicle Y1.

In Embodiment 3, in order to reduce the possible calculation error of the position of the moving object, the distance to the moving object is calculated based on the point F2 representing the position of the moving object detected based on the optical flow from the original image when the vehicle is detected from the original image. On the other hand, the distance to the moving object is calculated based on the grounding point H1 of the moving object detected by the frame difference from the bird's-eye view image when the pedestrian is detected from the original image.

A process of identifying the position and the width the moving object will be described below with reference to FIGS. 29A, 29B.

FIG. 29A shows the process of identifying the position and the width of the moving object when the pedestrian is detected as the moving object.

More specifically, when the moving object (region X1') is detected based on the difference between the bird's-eye view images, and when the moving object (rectangular region Ri) is not detected based on the optical flow; the distance Di from the XY coordinate value (HXi. HYj) of the grounding point of the region Xi' obtained based on the difference between the bird's-eye view images to the moving object is calculated. The lateral direction position FXp of the moving object is calculated based on the distance Di and the position of the point Fp (FXp, FYp) representing the pedestrian pattern. The width Wi of the moving object is calculated based on the distance Di and the width wp of the pedestrian pattern.

When the moving object (region Xi') is detected based on the difference between the bird's-eye view images, and the moving object (rectangular region Ri) is also detected based on the optical flow, the distance Di is calculated based on the XY coordinate value (HXi, HYi) of the grounding point of the region Xi' obtained based on the difference between the bird's-eye view images. The lateral direction position FXi of the moving object is calculated based on the coordinate value (FXi, FYi) of the point Fi obtained based on the optical flow, the position of the point Fp (FXp, FYp) representing the pedestrian pattern, and the distance Di. The width Wi of the moving object is also calculated based on the distance Di and the width wi of the pedestrian pattern.

FIG. 29B shows the process of identifying the position and width of the moving object when the vehicle is detected as the moving object.

More specifically, when the moving object (region Xi') is detected based on the difference between the bird's-eye view images, and the moving object (rectangular region Ri) is not detected based on the optical flow, the distance Di is calculated based on the XY coordinate value (HXi, HYi) of the grounding point of the region Xi' obtained based on the difference between the bird's-eye view images. The lateral direction position FXi of the moving object is calculated based on the distance Di and the position of the point Fv (FXv, FYv) representing the vehicle pattern. The width Wi of the moving object is also calculated based on the distance Di and the width wi of the vehicle pattern.

When the moving object (region Xi') is detected based on the difference between the bird's-eye view images and the moving object (rectangular region Ri) is also detected based on the optical flow, the distance Di is calculated based on the XY coordinate value (HXi, HYi) of the grounding point of the region Xi' obtained based on the difference between the bird's-eye view images. The lateral direction position FXi of the moving object is calculated based on the distance D1, the position of the point Fv (FXv, FYv) representing the vehicle pattern, and the coordinate value (FXi, FYi) of the point Fi obtained based on the optical flow. The width Wi of the moving object is also calculated based on the distance Di and the width wi of the vehicle pattern.

As described above, in Embodiment 3, the method of calculating the width of the moving object, the lateral direction position of the moving object, and the distance to the moving object is changed between the pedestrian detected as the moving object and the vehicle detected as the moving object.

Figure 25:
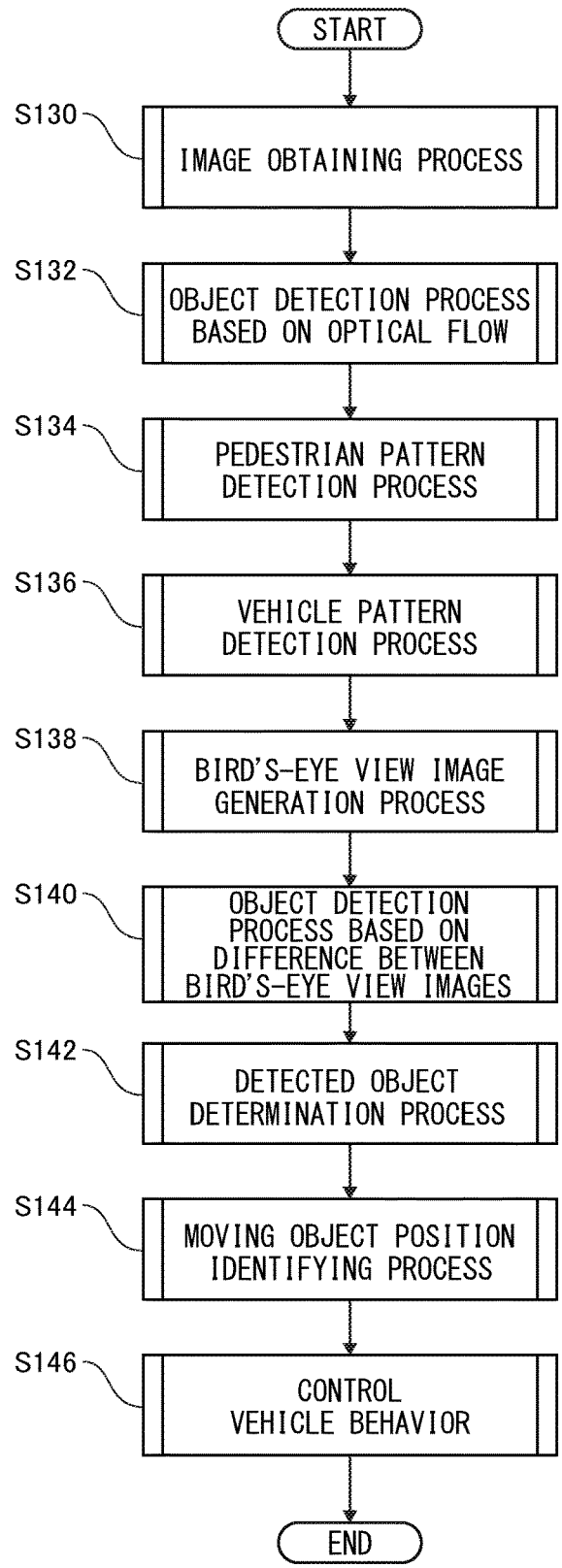
FIG. 25 is a flowchart showing flow of overall processes in the vehicle behavior control device in Embodiment 3.

Flow of a series of processes in the vehicle behavior control device 100c will be described with reference to the flowchart of FIG. 25 and the functional block diagrams of FIGS. 22 and 23. Hereinafter, each process will be briefly described, and the detailed flow of each process will be described later.

In Step S130, an image behind the vehicle 10 is obtained by the rear camera 12.

In Step S132, the movement region detector 57 (first object detector) executes the object detection process based on the optical flow.

In Step S134, the movement region detector 57 (first object detector) executes the pedestrian pattern detection process.

In Step S136, the movement region detector 57 (first object detector) executes the vehicle pattern detection process.

In Step S138, the bird's-eye view image processor 56 executes the bird's-eye view image generation process.

In Step S140, the difference calculator 58 (second object detector) executes the moving object detection process based on the difference between the bird's-eye view images.

In Step S142, the detected object determination part 61 executes the detected object determination process.

In Step S144, the moving object position identifying part 65 executes the moving object position identifying process.

In Step S146, the vehicle behavior controller 80 controls the behavior of the vehicle 10.

Figure 26:
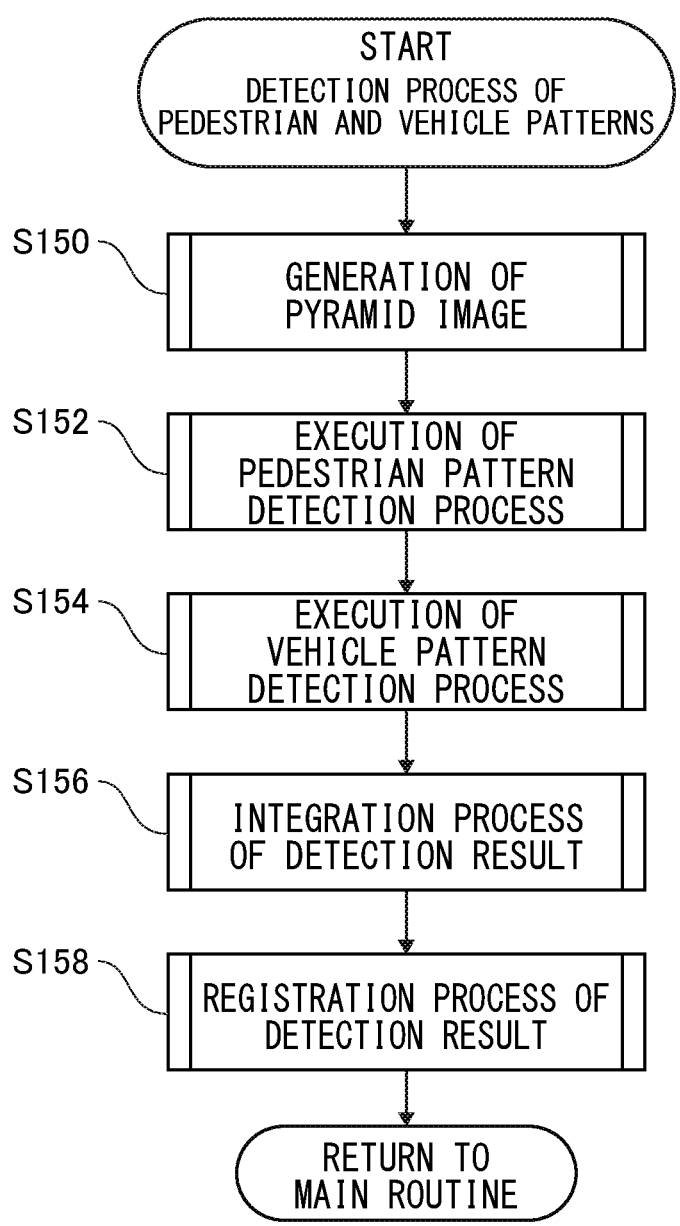
FIG. 26 is a flowchart showing flow of a pedestrian pattern detection process and a vehicle pattern detection process in the flowchart of FIG. 25.

The flow of the pedestrian pattern detection process in Step S134 of FIG. 25 and the flow of the vehicle pattern detection process in Step S136 of FIG. 25 will be described with reference to the flowchart of FIG. 26. In the flowchart of FIG. 25, the pedestrian pattern detection process (Step S134) and the vehicle pattern detection process (Step S136) are separately described. However, these processes are executed to the same original image I (x, y, t). The processes are thus executed as a sequence of the processes as shown in FIG. 26.

In Step S150, a pyramid image is generated from the original image I (x, y, t).

In Step S152, the pedestrian pattern detection process of detecting a pedestrian pattern is executed to the pyramid image.

In Step S154, the vehicle pattern detection process of detecting a vehicle pattern is executed to the pyramid image.

In Step S156, a plurality of detection patterns showing the same pedestrian is integrated for the detected pedestrian patterns. A plurality of detection patterns showing the same vehicle is also integrated for the detected vehicle patterns.

In Step S158, the registration process of the detected pedestrian pattern and vehicle pattern is executed. More specifically, the vertex coordinate of the rectangular region Ri which has contact with the outside of the detected pattern and the coordinate of the point Fi (point corresponding to point F1 in FIG. 7) which is the center of the lower side of the rectangular region Ri are calculated and stored. After that, the flow returns to the main routine (FIG. 25).

Figure 27A:
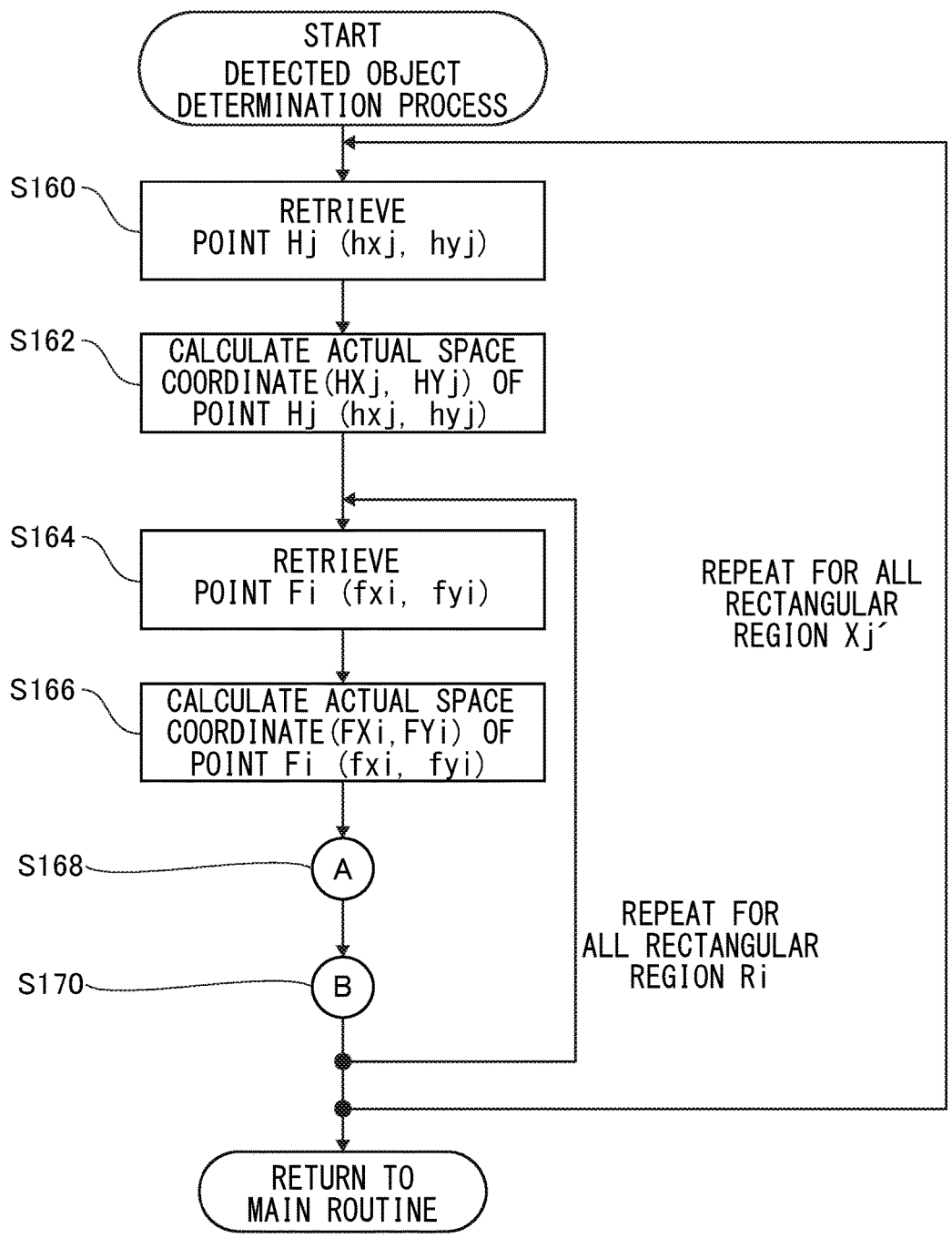
FIG. 27A is a first flowchart showing flow of a detected object determination process in the flowchart of FIG. 25.

The flow of the detected object determination process in Step S142 of FIG. 25 will be described with reference to the flowcharts of FIGS. 27A to 27C.

In Step S160, the information on the grounding point Hj (hxj, hyj) stored by the process of Step S140 is retrieved.

In Step S162, an actual space coordinate (HXj, HYj) of the grounding point Hj is calculated. Alternatively, when the actual space coordinate (HXj, HYj) is previously stored, the stored information is retrieved.

In Step S164, the information on the point Fi (fxi, fyi) stored by the process in Step S132 is retrieved.

In Step S166, the actual space coordinate (FXi, FYi) of the point Fi (fxi, fyi) is calculated.

Figure 27B:
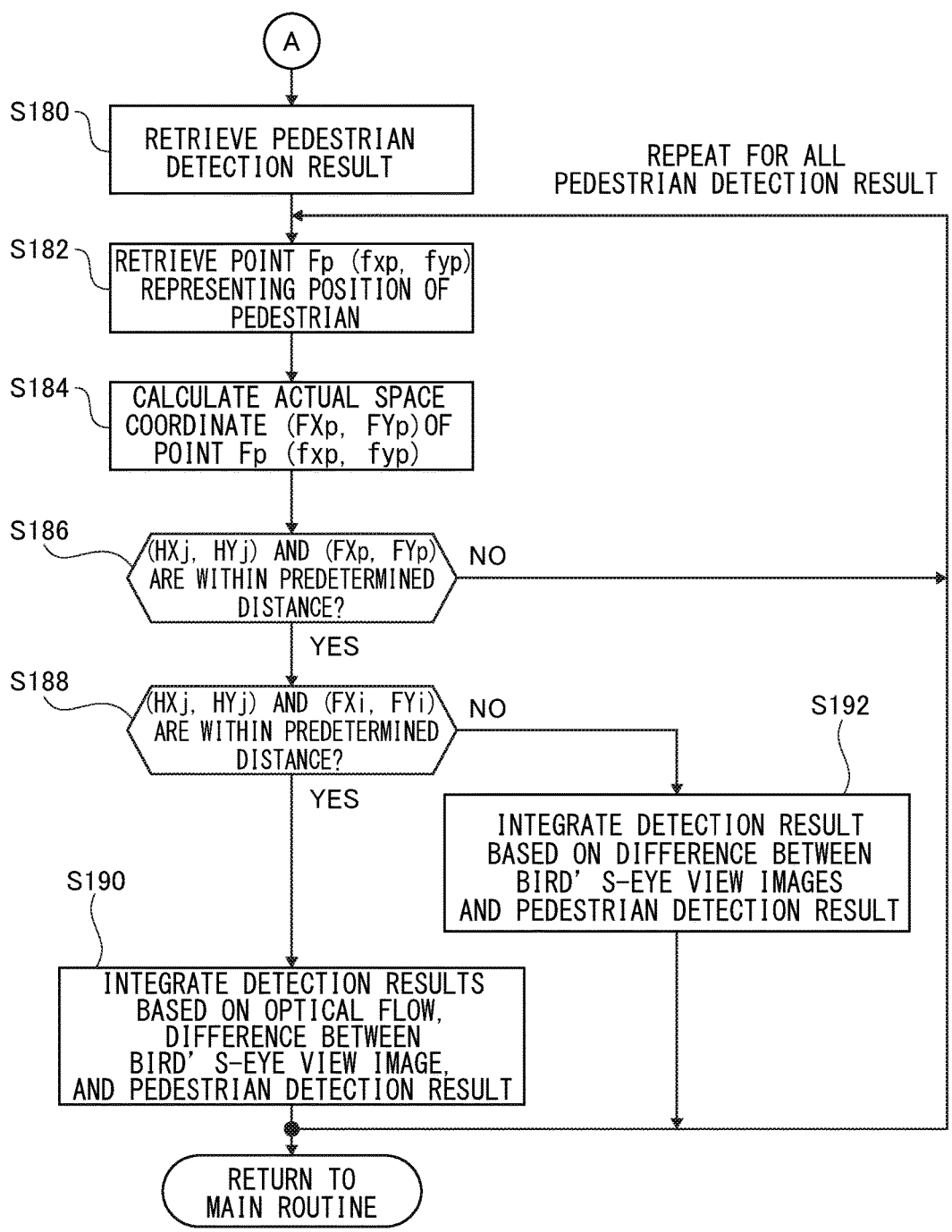
FIG. 27B is a second flowchart showing the flow of the detected object determination process in the flowchart of FIG. 25.

In Step S168, the flow of the flowchart of FIG. 27B is executed.

Figure 27C:
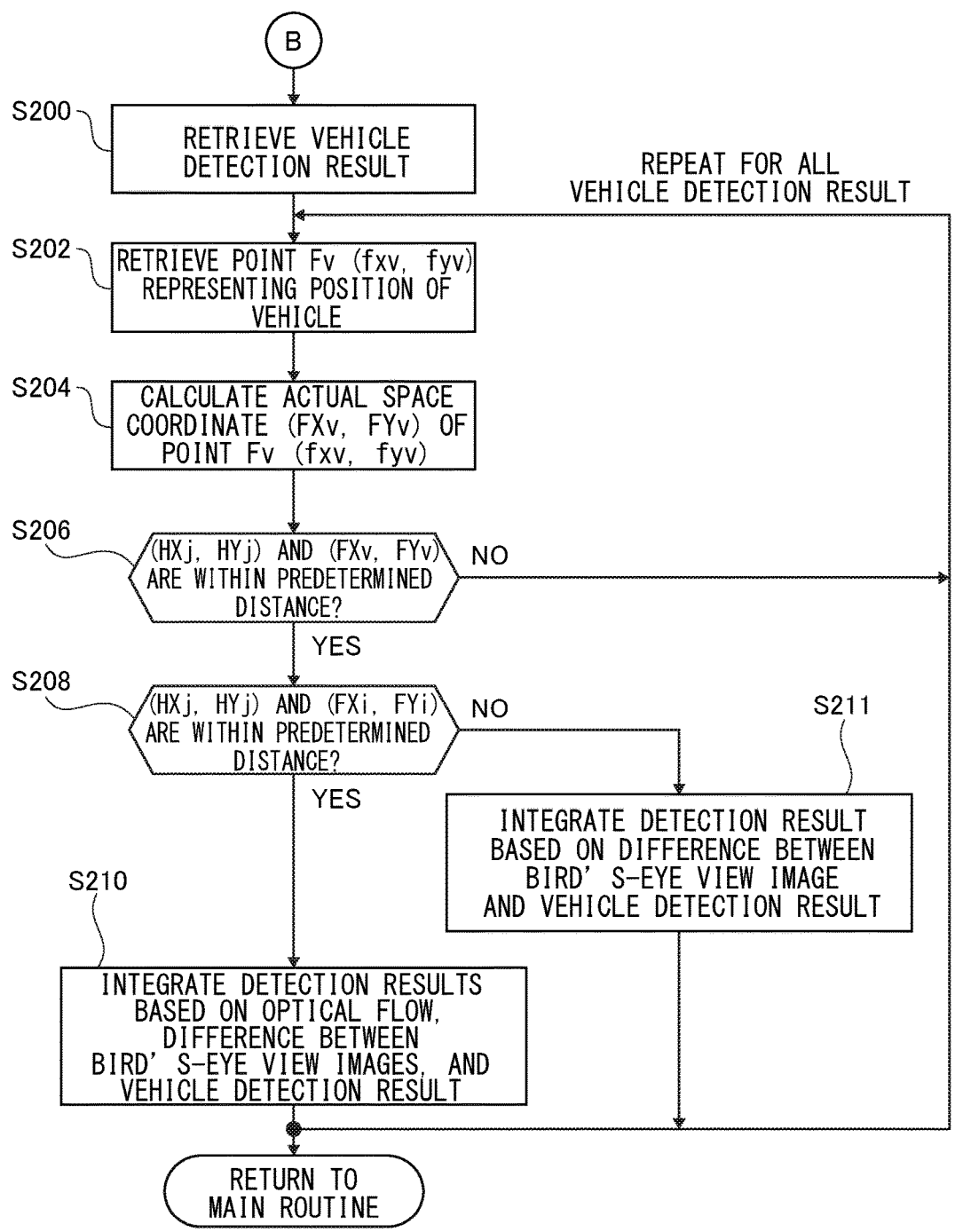
FIG. 27C is a third flowchart showing the flow of the detected object determination process in the flowchart of FIG. 25.

In step S170, the flow of the flowchart of FIG. 27C is executed. In addition, processes in Steps S164 to S170 are repeated to all of the rectangular regions Ri. The processes in Steps S160 to S170 are repeated to all of the regions Xj'. After that, the flow returns to the main routine (FIG. 25).

Hereinafter, the flow of the process in Step S168 of FIG. 27A will be described with reference to FIG. 27B.

In Step S180, the pedestrian detection result is retrieved.

In Step S182, the point Fp (fxp, fyp) showing the position of the pedestrian is retrieved.

In Step S184, the actual space coordinate (Fxp, Fyp) of the point Fp (fxp, fyp) is calculated.

In Step S186, it is determined whether or not the distance between the actual space coordinate (HXj, HYj) of the grounding point Hj and the actual space coordinate (Fxp, Fyp) of the point Fp is within a predetermined distance. In the case of YES, the flow proceeds to Step S188. In the case of NO, the flow returns to Step S182, and the processes are executed to a different pedestrian detection result.

In Step S188, it is determined whether or not the distance between the actual space coordinate (HXj, HYj) of the grounding point Hj and the actual space coordinate (Fxi, Fyi) of the point Fi is within a predetermined distance. In the case of YES, the flow proceeds to Step S190. In the case of NO, the flow proceeds to Step S192.

In Step S190, it is determined that the detection result of the moving object based on the optical flow, the detection result of the moving object based on the difference between the bird's-eye view images, and the pedestrian detection result show the same moving object, and these detection results are integrated. The integrated information is managed by the additional character k similar to Embodiments 1 and 2, and stored in the detected object determination part 61. The processes in Steps S182 to S190 are repeated to all of the pedestrian detection results. After that, the flow returns to the main routine (FIG. 25).

In Step S192, it is determined that the detection result of the moving object based on the difference between the bird's-eye view images and the pedestrian detection result show the same moving object, and these detection results are integrated. The integrated information is managed by the additional character k similar to Embodiments 1, 2, and stored in the detected object determination part 61. The processes in Steps S182 to S192 are repeated to all of the pedestrian detection results. After that, the flow returns to the main routine (FIG. 25).

The flow of the process in Step S170 of FIG. 27A will be described with reference to FIG. 27C.

In Step S200, the vehicle detection result is retrieved.

In Step S202, the point Fv (fxv, fyv) showing the position of the vehicle is retrieved.

In Step S204, the actual space coordinate (FXv, FYv) of the point Fv (fxv, fyv) is calculated.

In Step S206, it is determined whether or not the distance between the actual space coordinate (HXj, HYj) of the grounding point Hj and the actual space coordinate (FXv, FYv) of the point Fv is within a predetermined distance. In the case of YES, the flow proceeds to Step S208. In the case of NO, the flow returns to Step S202, and the processes are executed to a different vehicle detection result.

In Step S208, it is determined whether or not the distance between the actual space coordinate (HXj, HYj) of the grounding point Hj and the actual space coordinate (FXi, FYi) of the point Fi is within a predetermined distance. In the case of YES, the flow proceeds to Step S210. In the case of NO, the process proceeds to Step S212.

In Step S210, it is determined that the detection result of the moving object based on the optical flow, the detection result of the moving object based on the difference between the bird's-eye view images, and the vehicle detection result show the same moving object. These detection results are integrated. The integrated information is managed by the additional character k similar to Embodiments 1 and 2, and stored in the detected object determination part 61. In addition, the processes in Steps S202 to S210 are repeated to all of the vehicle detection results. After that, the flow returns to the main routine (FIG. 25).

In Step S212, it is determined that the detection result of the moving object based on the difference between the bird's-eye view images and the vehicle detection result show the same moving object. These detection results are integrated. The integrated information is managed by the additional character k similar to Embodiments 1 and 2, and stored in the detected object determination part 61. The processes in Steps S202 to S212 are repeated to all of the vehicle detection results. After that, the flow returns to the main routine (FIG. 25).

Figure 28:
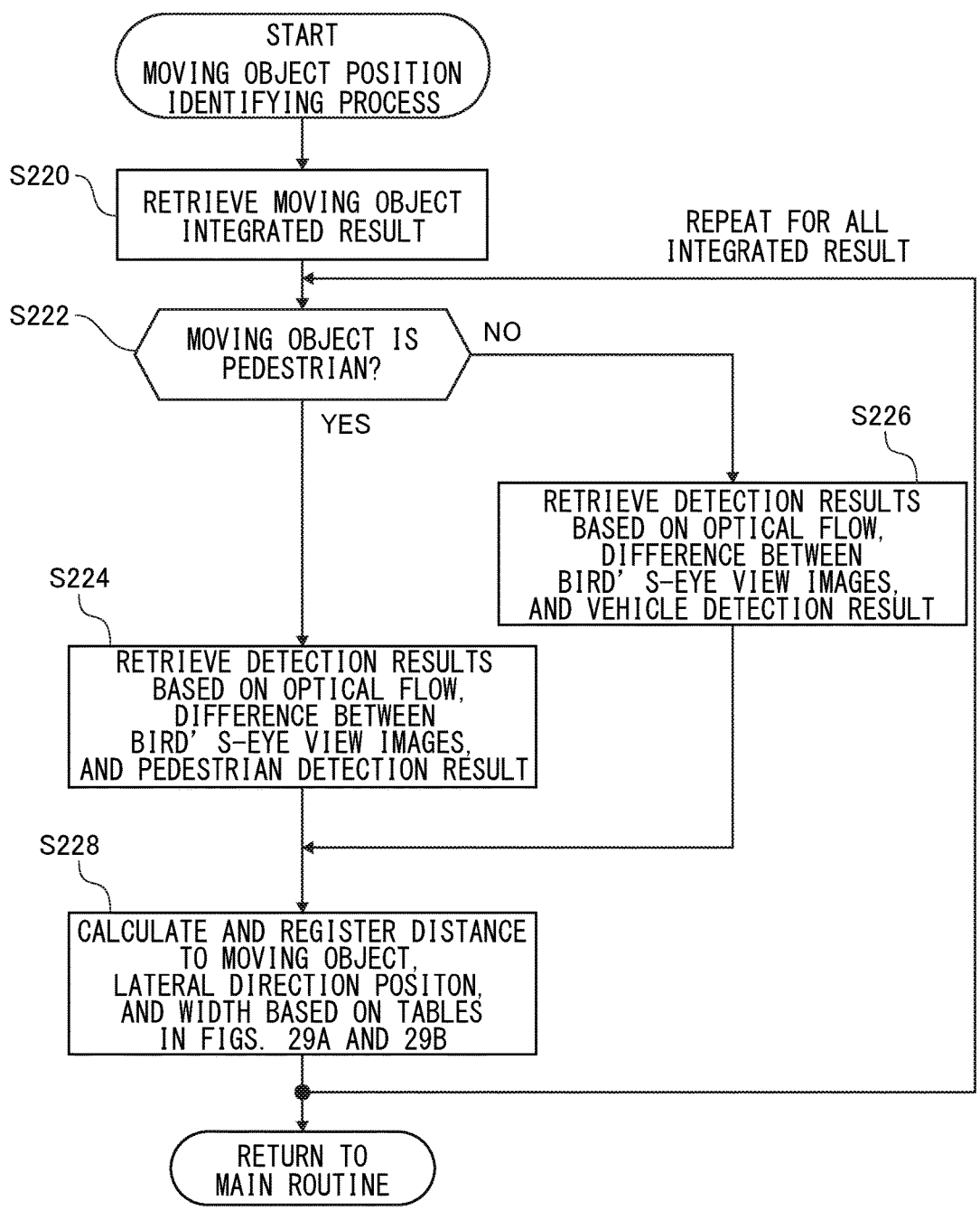
FIG. 28 is a flowchart showing flow of a moving object position identifying process in the flowchart of FIG. 25.

The flow of the moving object position identifying process in Step S144 of FIG. 25 will be described with reference to the flowchart of FIG. 28.

In Step S220, the moving object integrated result integrated by the above-described detected object determination process is retrieved from the detected object determination part 61.

In Step S222, it is determined whether or not the integrated moving object is a pedestrian. In the case of YES, the flow proceeds to Step S224. In the case of NO, the flow proceeds to Step S226.

In Step S224, the detection result based on the optical flow, the detection result based on the difference between the bird's-eye view image, and the pedestrian detection result are retrieved from the detection results corresponding to the focused moving object integrated results.

In Step S226, the detection result based on the optical flow, the detection result based on the difference between the bird's-eye view images, and the vehicle detection result are retrieved from the detection results corresponding to the focused moving object integrated results.

In Step S228, the distance to the moving object, the lateral direction position, and the width are calculated based on the tables in FIGS. 29A and 29B, and are registered. In addition, the processes in Steps S222 to S228 are repeated to all of the moving object integrated results. After that, the flow returns to the main routine (FIG. 25).

As described above, in the vehicle behavior control device 100a according to Embodiment 1 of the present invention, the rear camera 12 (image processor) mounted on the vehicle 10 obtains the original image I (x, y, t) including the image around the vehicle 10, the movement region detector 54 (first object detector) detects the moving object from the original image I (x, y, t), the difference calculator 58 (second object detector) detects the moving object from the bird's-eye view image J (x, y, t) of the vehicle 10, which is generated in the bird's-eye view image processor 56, the detected object determination part 60 determines that the moving object detected by the movement region detector 54 and the moving object detected by the difference calculator 58 are the same object when the distance between these objects is within the predetermined distance, the moving object position identifying part 62 identifies the position of the moving object based on the distance Dk from the vehicle 10 to the moving object detected by the movement region detector 54 or the difference calculator 58, the lateral direction position FXk of the moving object, and the actual width Wk of the moving object detected by the movement region detector 54. The lateral direction position FXk of the moving object, the width Wk of the moving object, and the distance Dk from the vehicle 10 to the moving object are therefore detected with higher accuracy by using only the image captured by the rear camera 12 without using a distance measurement sensor, for example.

In the vehicle behavior control device 100a according to Embodiment 1 of the present invention, the movement region detector 54 (first object detector) detects the moving object from the plane projection image Ip (x, y, t) in which the original image I (x, y, t) is projected on the plane vertical to the road surface. The moving object is detected by reliably correcting the distortion in the original image I (x, y, t) with the simple process using the prepared distortion correction table.

In the vehicle behavior control device 100a according to Embodiment 1 of the present invention, the movement region detector 54 (first object detector) detects the moving object based on the optical flow calculated from a plurality of original images I (x, y, t−Δt) and I (x, y, t) obtained at different times t−Δt and t. The movement region generated along the movement of the moving object is thus reliably detected.

In the vehicle behavior control device 100a according to Embodiment 1 of the present invention, the movement region detector 54 (first object detector) detects a pedestrian and a vehicle as the moving object. An object having a high potential of an obstacle while the vehicle 10 travels is therefore reliably detected.

In the vehicle behavior control device 100a according to Embodiment 1 of the present invention, the difference calculator 58 (second object detector) detects a moving object based on the result of the frame difference in a plurality of bird's-eye view images J (x, y, t−Δt) and J (x, y, t) generated from a plurality of original images I (x, y, t−Δt) and I (x, y, t) obtained at different times t−Δt and t. The position of the grounding point of the moving object is thus simply detected.

In the vehicle behavior control device 100a according to Embodiment 1 of the present invention, the braking and driving force of the vehicle 10 is controlled based on the recognition result of the external environment recognizing device for a vehicle 50a. The behavior of the vehicle 10 is thus reliably controlled in parking, for example, and the vehicle 10 is thus safely parked.

In the vehicle behavior control device 100b according to Embodiment 2 of the present invention, the movement region detector 55 (first object detector) detects the moving object from the cylindrical surface projection image Ic (x, y, t) (projection image) in which the original image I (x, y, t) is projected on the cylindrical surface orthogonal to the road surface. The distortion in the original image I (x, y, t) is therefore corrected by the simple process using the prepared distortion correction table, and the wider-view image information is therefore obtained. Namely, when the rear camera 12 having a wide-angle lens such as a fish eye lens is used, a wider-range image is obtained even after the distortion is corrected.

In the vehicle behavior control device 100c according to Embodiment 3 of the present invention, the movement region detector 57 (first object detector) detects the moving object with the pattern matching to the original image I (x, y, t). The features of the shape and gray scale of the moving object in the original image are therefore used, and the pedestrian and the vehicle are thus further reliably detected.

In the vehicle behavior control device 100c according to Embodiment 3 of the present invention, the detected object determination part 61 determines whether or not the moving object is a pedestrian or a vehicle. When the moving object is a pedestrian, the moving object position identifying part 65 calculates the distance Dk to the moving object based on the detection result of the difference calculator 58 (second object detector). When the moving object is a vehicle, the moving object position identifying part 65 calculates the distance Dk to the moving object based on the detection result of the movement region detector 57 (first object detector). The result detected by the highly accurate detection method is therefore used according to the type of the moving object, and the moving object is thus detected with high accuracy.

Embodiments 1 to 3 show the examples that detect a pedestrian and a vehicle as moving objects. However, the moving object is not limited to the pedestrian and the vehicle. Namely, any moving object may be detected as long as it has a height from the road surface and has risk of a collision to the vehicle 10.

Embodiments 1 to 3 show the examples using the rear camera 12 mounted on the back end of the vehicle 10. However, the mounting position of the camera is not limited to the back end of the vehicle 10. A plurality of cameras may be used. Namely, the configuration similar to Embodiments 1 to 3 is achieved even when the camera is mounted on each of the front end, right and left ends, and back end of the vehicle.

Although the embodiments of the present invention have been described above, the present invention is not limited thereto. It should be appreciated that variations may be made in the embodiments described by persons skilled in the art without departing from the scope of the present invention.

The invention claimed is:

1. An external environment recognizing device for a vehicle, comprising:
    an image processor configured to be installed in the vehicle and obtain an image around the vehicle;
    a first object detector configured to detect a moving object from the image;
    a bird's-eye view image processor configured to generate a bird's-eye view image of the vehicle from the image;
    a second object detector configured to detect a moving object from the bird's-eye view image;
    a detected object determination part configured to: (i) obtain a distance between a point corresponding to a center of a lower side of a rectangular region circumscribing an outside of the moving object detected by the first object detector and a grounding point of the moving object detected by the second object detector, wherein the grounding point is configured to have contact with a road surface, and wherein the point and the grounding point are converted into XY coordinate values; and (ii) determine that the moving object detected by the first object detector and the moving object detected by the second object detector are the same moving object when a distance between the point and the grounding point is within a predetermined distance; and
    a moving object position identifying part configured to identify a position of the moving object detected by the first object detector or the second object detector based on a distance from the vehicle to the moving object detected by the first object detector or the second object detector, a lateral direction position of the moving object detected by the first object detector or the second object detector, and a width of the moving object detected by the first object detector when the detected object determination part determines that the moving object detected by the first object detector and the moving object detected by the second object detector are the same moving object.

2. The external environment recognizing device according to claim 1, wherein the first object detector is configured to detect the moving object in a projection image in which the image is projected to a plane vertical to the road surface.

3. The external environment recognizing device according to claim 2, wherein the plane vertical to the road surface has a curved surface.

4. The external environment recognizing device according to claim 1, wherein the image is one of a plurality of images obtained at different times and the first object detector is configured to detect the moving object based on optical flow calculated from the plurality of images obtained at different times.

5. The external environment recognizing device according to claim 1, wherein the first object detector is configured to detect the moving object with pattern matching to the image.

6. The external environment recognizing device according to claim 1, wherein the first object detector is configured to detect a pedestrian as the moving object and the first object detector is configured to detect another vehicle as the moving object.

7. The external environment recognizing device according to claim 1, wherein the image is one of a plurality of images obtained at different times, the bird's-eye view image is one of a plurality of bird's-eye view images generated from the plurality of images obtained at different times and the second object detector is configured to detect the moving object based on a difference result between the plurality of bird's-eye view images generated from the plurality of images obtained at different times.

8. The external environment recognizing device according to claim 1, wherein:
    the detected object determination part is configured to determine whether the moving object detected by the first object detector or the second object detector is a pedestrian or another vehicle, and the moving object position identifying part is configured to calculate the distance from the vehicle to the moving object detected by the second object detector based on a detection result of the second object detector when the moving object detected by the second object detector is the pedestrian, and calculate the distance from the vehicle to the moving object detected by the first object detector based on a detection result of the first object detector when the moving object detected by the first object detector is the other vehicle.

9. A vehicle behavior control device configured to control a braking and driving force of a vehicle based on a recognition result of the external environment recognizing device according to claim 1.

* * * * *